United States Patent
Craeghs et al.

(10) Patent No.: US 10,719,929 B2
(45) Date of Patent: Jul. 21, 2020

(54) ERROR DETECTION IN ADDITIVE MANUFACTURING PROCESSES

(71) Applicant: MATERIALISE NV, Leuven (BE)

(72) Inventors: Tom Craeghs, Leuven (BE); Sven Cornelissen, Leuven (BE); Tom Cluckers, Hasselt (BE); Jan Van Espen, Leuven (BE)

(73) Assignee: Materialise N.V., Leuven (BE)

( * ) Notice: Subject to any disclaimer, the term of this patent is extended or adjusted under 35 U.S.C. 154(b) by 135 days.

(21) Appl. No.: 15/773,131

(22) PCT Filed: Nov. 16, 2016

(86) PCT No.: PCT/US2016/062165
§ 371 (c)(1),
(2) Date: May 2, 2018

(87) PCT Pub. No.: WO2017/087451
PCT Pub. Date: May 26, 2017

(65) Prior Publication Data
US 2018/0322621 A1 Nov. 8, 2018

Related U.S. Application Data

(60) Provisional application No. 62/255,943, filed on Nov. 16, 2015.

(51) Int. Cl.
*G06T 7/00* (2017.01)
*G01N 21/88* (2006.01)
(Continued)

(52) U.S. Cl.
CPC ............ *G06T 7/001* (2013.01); *B23K 26/342* (2015.10); *B23K 31/125* (2013.01);
(Continued)

(58) Field of Classification Search
CPC . G06T 7/001; G06T 7/90; G06T 2207/10016; G06T 2207/30108;
(Continued)

(56) References Cited

U.S. PATENT DOCUMENTS

| 5,808,735 A | 9/1998 | Lee et al. |
|---|---|---|
| 2006/0133661 A1* | 6/2006 | Takeda ............. G01N 21/95607 382/149 |

(Continued)

OTHER PUBLICATIONS

International Search Report and Written Opinion dated Feb. 24, 2017, in application PCT/US2016/062165.

(Continued)

*Primary Examiner* — Menatoallah Youssef
(74) *Attorney, Agent, or Firm* — Patterson + Sheridan, LLP

(57) ABSTRACT

The present disclosure relates to the prediction of part and material quality of Additive Manufacturing (AM) processes using layer based images. Described herein are methods and systems for detection of errors in parts built by AM processes such as Selective Laser Melting (SLM). The detection comprises analysis of optical images to identify errors which appear in layers during the AM build process. Errors include but are not limited to warpage of parts and dross formation of overhang surfaces.

22 Claims, 15 Drawing Sheets

(51) Int. Cl.
*B29C 64/386* (2017.01)
*B33Y 50/02* (2015.01)
*B23K 26/342* (2014.01)
*G06T 7/90* (2017.01)
*B23K 31/12* (2006.01)
*B33Y 10/00* (2015.01)
*B33Y 30/00* (2015.01)

(52) U.S. Cl.
CPC ............ *B29C 64/386* (2017.08); *B33Y 50/02* (2014.12); *G01N 21/8851* (2013.01); *G06T 7/90* (2017.01); *B33Y 10/00* (2014.12); *B33Y 30/00* (2014.12); *G06T 2207/10016* (2013.01); *G06T 2207/30108* (2013.01)

(58) Field of Classification Search
CPC .. G01N 21/8851; B29C 64/386; B33Y 50/02; B33Y 10/00; B33Y 30/00; B33Y 50/00; B23K 26/342; B23K 31/125
See application file for complete search history.

(56) References Cited

U.S. PATENT DOCUMENTS

2011/0280470 A1* 11/2011 Hayashi ............. G01N 21/9505
382/149
2015/0177158 A1* 6/2015 Cheverton ............ B22F 3/1055
700/119

OTHER PUBLICATIONS

J-Y Jeng et al:"On-Line Layer Profile Dimensions Measurement of Model Maker Rapid Prototyping Using Vision Technology", International Journal of Advances Manufacturing Technology, Springer Verlag, London; GB, vol. 17, No. 2, Jan. 1, 2001.

* cited by examiner

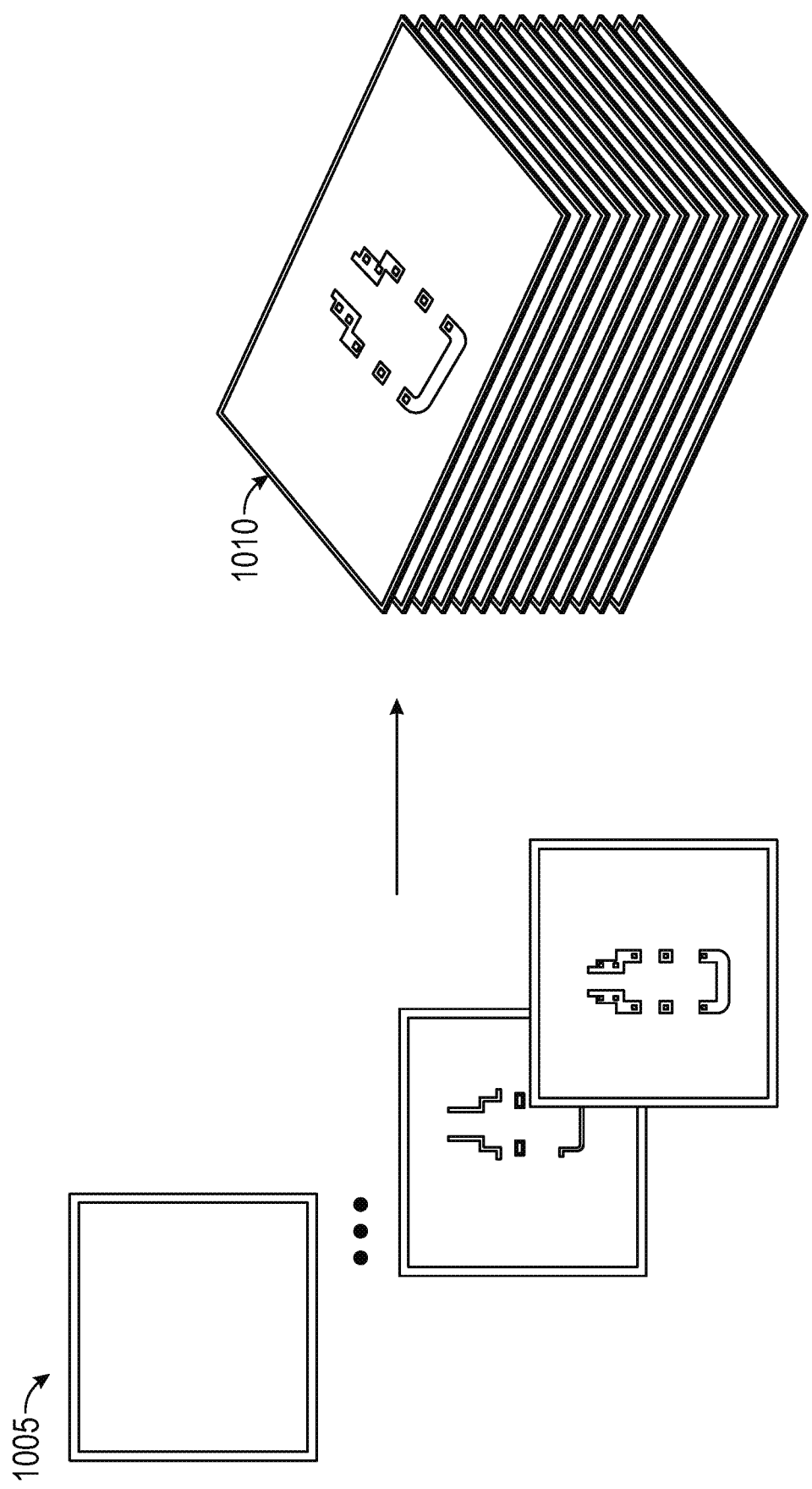

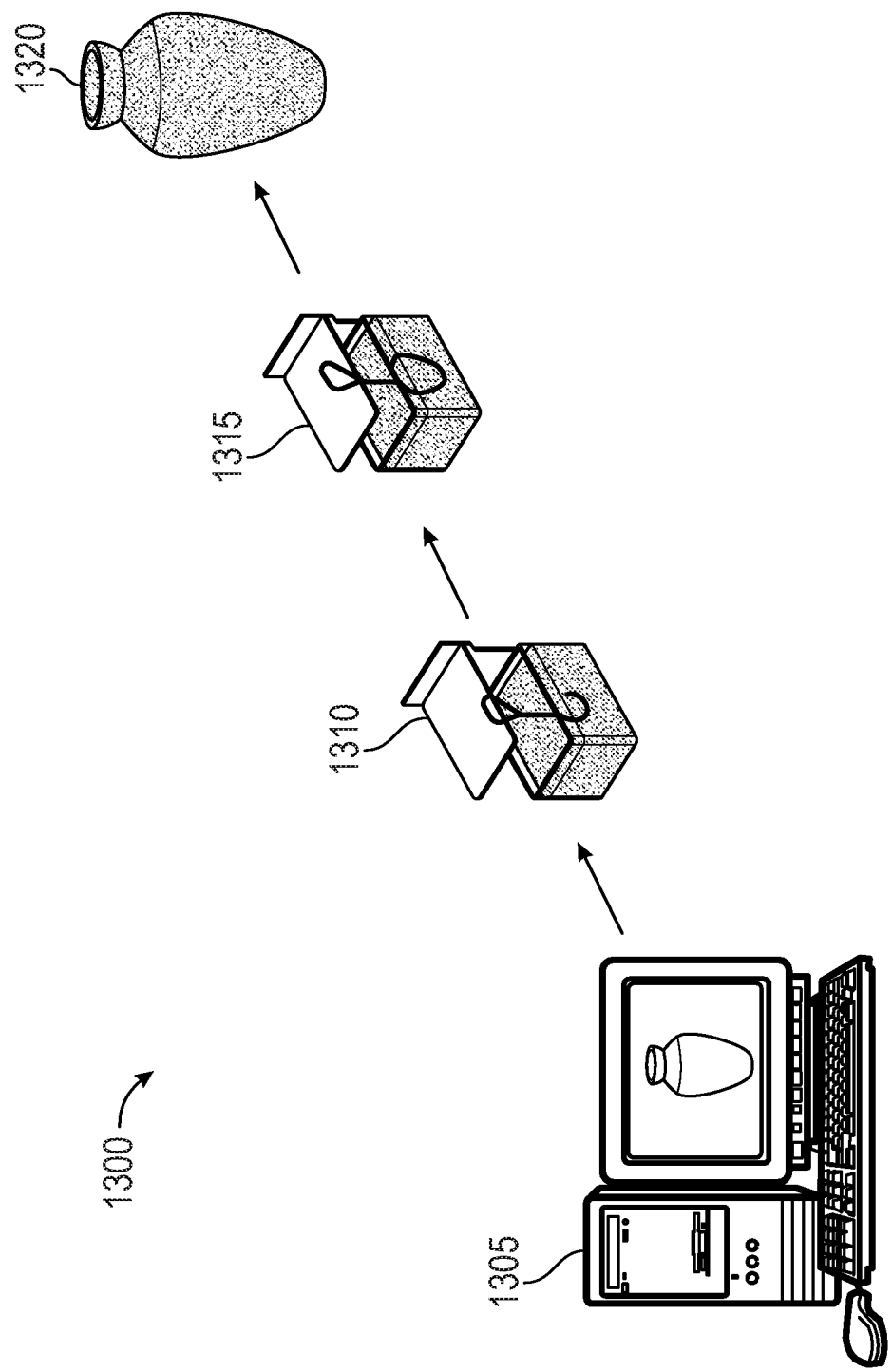

ERROR DETECTION IN ADDITIVE MANUFACTURING PROCESSES

CROSS-REFERENCE TO RELATED APPLICATIONS

This application claims the benefit of U.S. Provisional Patent No. 62/255,943, filed Nov. 16, 2015. The content of the provisional application is hereby incorporated by reference in its entirety.

BACKGROUND OF THE INVENTION

Field of the Invention

The present disclosure relates to Additive Manufacturing (AM) processes. More particularly, the present disclosure relates to methods and systems for detection of errors in parts built by AM processes through analysis of optical images to identify errors which appear during the AM build process.

Description of the Related Technology

Additive Manufacturing (AM) processes are a material-addition approach to building parts, typically starting from a base material in liquid, solid sheet or powder form and consolidating the added material locally, in layer-by-layer fashion. Since the emergence of the first AM processes in the early 1990's, AM processes have been used as an alternative to conventional material-removal techniques such as milling, cutting or drilling or molding techniques, such as injection molding or extrusion molding, and have been shown to be especially effective in producing complex parts in a relatively short time, without dedicated tools such as molds or dies.

Among the best-known AM techniques are stereolithography (SLA), 3D-printing (3D-P), Selective Laser Sintering (SLS), Selective Heat Sintering (SHS), Selective Laser Melting (SLM), Direct Metal Laser Sintering (DMLS), Laser Beam Melting (LBM), and Electron Beam Melting (EBM). The techniques vary according to the tools used for consolidating the layers of a part, and according to materials that can be used in the techniques. For example, Selective Laser Melting (SLM) is an AM process in which complex metallic parts are produced in a layer-by-layer fashion. SLM offers greater design freedom than what is possible with conventional metal-removal processes, which is advantageous to industries with unique requirements for complex metal parts. In the aerospace industry, for example, metal airplane parts that must be both strong and lightweight can be configured with intricate geometric scaffolds and hollows using an SLM process. SLM can also provide benefits in the medical device industry, as bone implants or orthopedic accessories can be custom-designed and manufactured to fit individual patients.

Despite its current uses in the aerospace, medical-device, and many other industries, SLM must still overcome challenges before it realizes its full potential for manufacturing parts. One of the biggest challenges is quality monitoring and control, as robustness and reliability of the process have not been fully optimized. Variability in input parameters (atmosphere, deposition, and scanning parameters) and in boundary conditions (part geometry, material, and machine parameters) all affect the part quality.

Errors occurring in a few layers or even in a single layer can be compounded over the whole of the part, with the result that the part is not functional or cannot comply with quality requirements.

Accordingly, there remains a need in the art for methods and systems for error detection that are simple, sensitive, and reproducible.

SUMMARY

The present disclosure relates to methods and systems for detecting errors in additive manufacturing processes.

Certain embodiments provide a method for detecting an error of one or more parts during an additive manufacturing process. The method generally includes receiving a first optical image of a first layer of build material corresponding to the one or more parts before or after recoating. The method further includes determining gray values for one or more pixels in the first optical image. The method further includes detecting an error of at least one of the one or more parts based on at least one of the gray values in the first optical image compared to a threshold based on a reference image of build material.

Certain embodiments provide a computing device including a memory and a processor configured to perform the steps of the described method. Further, certain embodiments provide a non-transitory computer readable medium having instructions stored thereon that when executed by a computing device cause the computing device to perform the described method.

BRIEF DESCRIPTION OF THE DRAWINGS

FIG. 10A illustrates an example of individual optical images that are stacked to form a stack of optical images.

FIG. 13 shows a high-level process for manufacturing a 3D object using an additive manufacturing system.

DETAILED DESCRIPTION OF INVENTION

Figure 1:
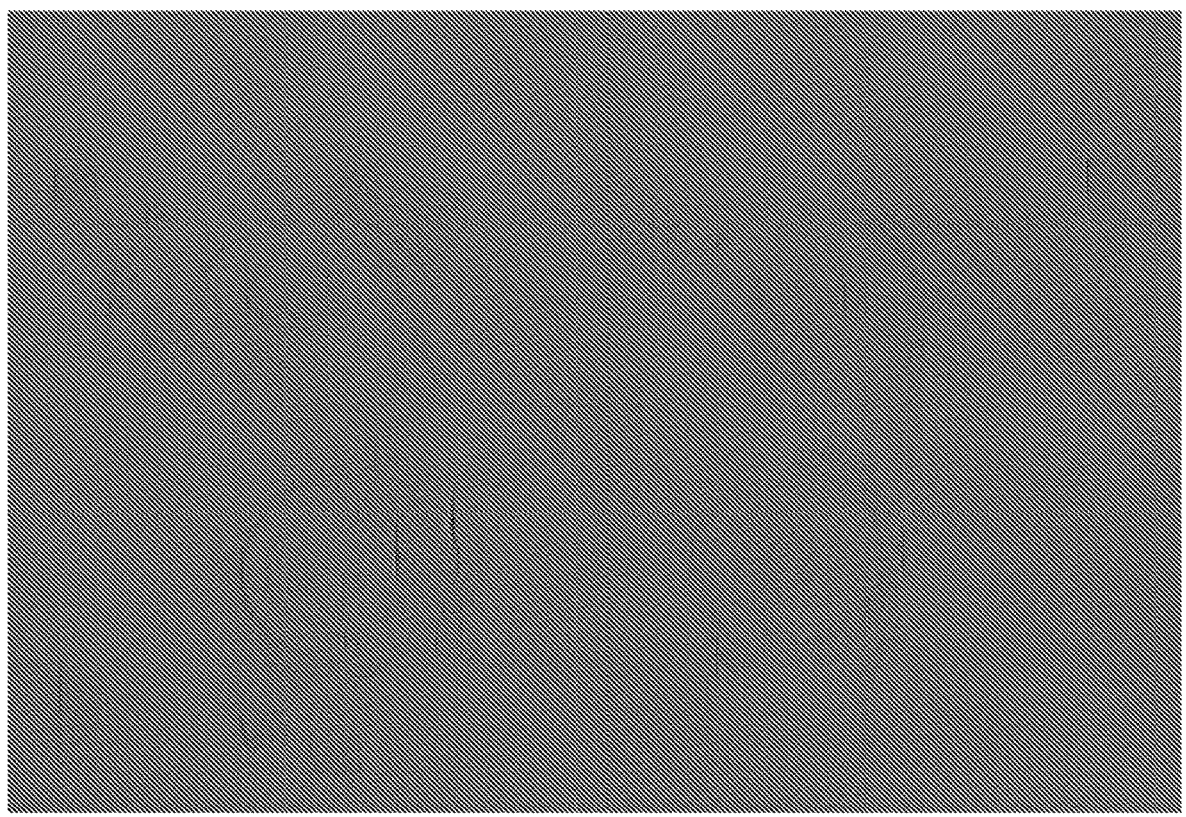
FIG. 1 illustrates an example of a captured image of build material where the pixels correspond to gray values.

The following description and the accompanying figures are directed to certain specific embodiments. The embodiments described in any particular context are not intended to limit this disclosure to the specified embodiment or to any particular usage. Those of skill in the art will recognize that the disclosed embodiments, aspects, and/or features are not limited to any particular embodiments. For example, reference to "a" layer, component, part, etc., may, in certain aspects, refer to "one or more."

Described herein are methods and systems for detection of errors in AM processes in which optical images of individual layers are taken (e.g., by an imaging device, such as a camera) and gray values of pixels in the optical images are analyzed (e.g., by a computing device). Errors such as warpage and dross formation in overhang surfaces can be detected, and the quality of a part can be determined. In some embodiments, detection of the errors is part of a monitoring process or system, and corrective actions can be applied (e.g., automatically by a computing device) during the build, or the build can be aborted. Thus, time and materials are not lost producing a part that will not reach the quality requirements.

One aspect of the present disclosure relates to methods and systems for detecting errors in parts during additive manufacturing (AM) processes. These methods and systems provide non-destructive, in-process inspection and quality control of the additively manufactured parts.

The systems and methods described herein may be performed using various additive manufacturing and/or three-dimensional (3D) printing systems and techniques. Typically, additive manufacturing techniques start from a digital representation (e.g., CAD file, such as STL, DWG, DXF, etc.) of the 3D object to be formed. Generally, the digital representation is divided into a series of cross-sectional layers (e.g., perpendicularly to the Z-direction, meaning parallel to a build platform), or "slices," which are overlaid to form the object as a whole. The layers represent the 3D object, and may be generated using additive manufacturing modeling software executed by a computing device. For example, the software may include computer aided design and manufacturing (CAD/CAM) software. Information about the cross-sectional layers of the 3D object may be stored as cross-sectional data. An additive manufacturing (e.g., 3D printing) machine or system utilizes the cross-sectional data for the purpose of building the 3D object on a layer by layer basis. Accordingly, additive manufacturing allows for fabrication of 3D objects directly from computer generated data of the objects, such as computer aided design (CAD) files or STL files. Additive manufacturing provides the ability to quickly manufacture both simple and complex parts without tooling and without the need for assembly of different parts.

Additive manufacturing processes generally include providing energy from an energy source (e.g., a laser, an electron beam, etc.) to solidify (e.g., polymerize) layers of building material (e.g., plastic, metal, etc.). For example, the additive manufacturing machine may selectively apply energy from an energy source to (e.g., scan) the building material based on a job file. The job file may include information regarding slices of a digital representation of an object or objects to be built using an additive manufacturing process. For example, 3D objects represented by CAD files may be arranged in a virtual build volume corresponding to the build volume of an additive manufacturing device. Optionally, support structures may be added to the 3D objects in the virtual build volume (e.g., to improve build quality, heat dissipation, reduce deformation, etc.) The resulting 3D objects may be divided into layers or slices, as discussed. The job file, accordingly, may include slices (e.g., a stack of slices) of the 3D objects, and parameters of the additive manufacturing machine for building the 3D objects.

For example, for each slice, the job file may include information regarding a scanning pattern for the energy source to apply energy to (e.g., laser to scan, electron beam to scan, etc.) the physical layer of building material corresponding to that slice. It should be noted that as discussed herein, the terms slice and layer may be used interchangeably. The scanning pattern may include one or more vectors that each indicates a spatial position to apply the energy to the layer of building material and a direction to apply the energy to the building material (e.g., a direction to move the laser beam, electron beam, or other energy source over the building material while scanning).

An additive manufacturing machine builds an object on a layer by layer basis by applying energy to (e.g., scanning) the layers of building material according to the scanning pattern for each individual layer as indicated in a job file. For example, the additive manufacturing machine may scan a first layer of physical building material corresponding to a first slice of a digital representation of an object according to the scanning pattern for the first slice. The additive manufacturing machine may then scan a second layer of building material corresponding to a second slice adjacent to the first slice according to the scanning pattern for the second slice. The additive manufacturing machine continues scanning layers of building material corresponding to all the slices in the job file, until the layer corresponding to the last slice is scanned.

The methods and systems described herein may detect errors in AM processes, such as stereolithography (SLA), 3D-printing (3D-P), Selective Laser Sintering (SLS), Selective Heat Sintering (SHS), Selective Laser Melting (SLM), Direct Metal Laser Sintering (DMLS), Laser Beam Melting (LBM), and Electron Beam Melting (EBM). In some embodiments, the methods and systems detect errors in powder-bed-fusion (PBF) processes of AM. In certain embodiments, the methods and systems detect errors in SLM. Though certain embodiments are described with respect to PBF processes and SLM for ease of understanding, it should be noted that the methods and systems may also be applied to other AM processes.

PBF processes involve the selective melting of atomized precursor powder beds by a directed energy source. The melting of the powder occurs in a small localized region of the energy beam, producing small volumes of melting, called melt pools, followed by rapid solidification, allowing for very precise control of the solidification process in the layer-by-layer fabrication of the part. In PBF processes such as DMLS, SLM, and LBM, a laser is used as the energy source. The laser is deflected by a rotating mirror, then focused by a lens so it selectively impinges on a powder bed. The powder is melted at the laser's focus site on the build surface or substrate. The strategy of the scanning, power of the energy beam, residence time or speed, and sequence of melting may be based on a job file, as discussed. The precursor powder is either gravitationally fed from cassettes or loaded by a piston so that it can be raked onto the build table, a process referred to as "recoating". The excess powder is typically raked off and collected for re-application. Since the laser is fixed, the build table can be lowered with each successive layer so that the part is built upon the pre-solidified layer beneath.

Errors may occur at different stages during the AM process, and may be caused when any parameter related to the machine or to the process is not optimal or when the 3D model of an object or objects is not optimized for 3D printing. In some embodiments, the methods and systems described herein detect errors arising when one or more parameters such as laser power, scan velocity, laser beam intensity profile, and strategy of scanning are not optimally controlled, or when a non-optimized design is printed. Errors detected by the methods and systems herein may arise in one or more parameters such as atmosphere parameters (e.g., atmosphere pressure surrounding the melt pool, oxygen content in the process chamber), powder bed parameters (e.g., layer thickness, powder-bed smoothness, and parameters related to preparation of powder layers in between scans), scanning parameters (e.g., laser power, scan velocity, scan strategy, laser-beam intensity profile, and parameters related to scanning of powder layer with the laser beam).

For example, during AM processes such as SLM, thermal stresses in the heated region of a part following laser scanning may result in bending and distortion of the part during cooling. Accordingly, errors detected by the methods and systems described herein include, but are not limited to, surface anomalies such as surface distortion and/or deformation, delamination between layers, balling, undesired porosity, cracking, curling, irregularities in surface texture and/or surface roughness, and inaccurate production of geometric features such as sharp corners or overhang surfaces.

Deformation of the surface layer may lead to errors in the dimensional accuracy of the part. Shrinkage of the part is one example of a deformation error. In a layer of the part, shrinkage may occur in the direction parallel to the layer orientation of the part, leading to a reduced surface area of the part. In some embodiments, surface deformation, for example due to thermal stresses, may cause regions in the upper surface of the layer of a part to project above the powder surface level. Warpage (also warp or warping) is an example of surface deformation in which there is a wrinkle, bend, twist, fold, unevenness, and/or other variation in shape from the intended shape (typically a flat, even, and/or planar shape). For example, warpage in the layer of a part built during an AM process such as SLM may cause all or a portion of the surface of the layer to project above its intended plane, and above the powder-surface level. Warpage is a structural error in the layer of the part, and this error may be repeated in further layers, as subsequent powder surface levels may be uneven, leading to recoating errors and even damage to the coater blade.

Warpage commonly occurs in AM processes such as SLM. In SLM, material around the laser spot is heated locally because of the fast movement of the heat source and the small interaction time between laser and material. This heating induces high local thermal gradients (in space) which subsequently cause large thermal stresses. The Temperature Gradient Mechanism (TGM) explains the physical mechanism behind the thermal stresses. The absorption of the laser light at the upper surface of the part induces a temperature gradient over a certain depth in the part. Due to the positive thermal expansion coefficient the thermal expansion in the heated zone on the upper side of the part is larger than the thermal expansion at the bottom of the heated zone. These different expansions tend to induce a bending of the upper zone away from the laser beam. This bending is typically not free, because it is constrained by the cold(er) material underneath the heated zone (previously solidified layers and base plate). Stress is therefore induced in the heated region, which is compressive on the upper side. Typically, these stresses reach a level higher than the (temperature dependent) yield stress of the material, such that plastic deformation of the material in the compressive zone occurs. After the laser beam has passed and the material has cooled down, the thermal expansion of the heated region vanishes, and the upper zone shrinks. This results in a bending of the specimen towards the laser beam.

In some embodiments, the warpage causes all or a portion of the surface of the layer to project above its intended plane, and above the powder surface level. The warpage may lead to a projection of about 500 µm. The warpage may be present in one individual layer, or may be present across a plurality of layers.

Accordingly, a warpage event (i.e., an occurrence of warpage) may be small or may be large, depending on the number of layers in which warpage appears. The size and extent of warpage may also depend on the cross-sectional area of the warpage in the xy plane.

Damaged or worn coater blades may be unable to deposit smooth, even layers of powder, resulting in surface errors such as a waviness of the surface and unintended surface roughness. Another common error in AM processes such as SLM is a shortage of feed powder, which may result in zones of the upper surface of a part which are not covered with sufficient amounts of new powder after coating.

Another error particularly common in PBF processes such as SLM is dross formation, for example in overhang surfaces of parts. Overhang surfaces (or zones) correspond to down-facing surfaces of parts in which powder is melted on top of loose powder particles and not on a portion of the part corresponding to solid material. For example, there is no solid surface below the portion of the part referred to as an overhang surface. The melt pool of the overhang zone sits not on solid material but on loose powder which has poor thermal conductivity (typically 0.2 W/mK) with respect to the corresponding bulk material. The heat sink of the loose powder is too low compared to the added energy, so overheating occurs in the overhang plane. Consequently, the melt zone becomes too large and capillary and gravity forces cause liquid material to spread into the underlying powder material. After solidification, the dross remains and gives rise to a poor surface finish which must be removed by post-processing treatments such as milling or sand-blasting, or the part must be discarded. For example, dross may appear as droplets or balls of solid material separated or loosely connected, instead of a smooth, continuous, solid material.

As discussed, different errors (e.g., warpage, dross formation, etc.) in an object being built may occur during AM processes. The errors in AM processes may limit the geometrical freedom of design that makes AM particularly attractive. Accordingly, some techniques relate to preventing and minimizing errors, for example by designing suitable support structures or by optimizing the build direction, or by adjusting other parameters of the build process. Other techniques relate to methods for detecting errors such as using feedback control. For example, because the melting process links input parameter to part quality, melting behavior is a crucial element of the final part quality. Melt zone dynamics may be monitored by detecting electromagnetic radiation emitted or reflected from the melt zone, while 2-D maps may be generated to represent melt zone behavior. Optical and thermal sensing during a manufacturing process may be used to identify, examine, and analyze features associated with a heat source (e.g., heat dissipation, emitted radiation, etc.), while images of locally-emitted IR radiation from an applied powder layer may be analyzed.

Some techniques relate to monitoring of the volumetric surface texture of objects being built, or collecting dimensional data during a build and comparing it to an input geometric description in order to determine if a part has been built correctly. However, these methods still require complex equipment, including such as, a profilometer, interferometer, structure light for 3D shape and profile measurements, and an X-ray scanner, as well as algorithms for such processes as machine vision, 3D optical scanning, and photogrammetry. Similarly, some techniques related to characterizing porosity in parts produced by polymer SLS require computed tomography (CT) images in order to analyze specific features such as pore distributions, volumes, and sphericities. Accordingly, such techniques may require complex equipment and/or analysis algorithms, lack sensitivity, or give rise to false positives in detecting errors.

Some techniques relate to using optical imaging in the visible spectrum and analysis of images of individual layers collected during a build. For example, optical data may be collected over multiple recoating cycles and individual layers or accumulated data evaluated. In some aspects, such optical data may be analyzed for surface error. However, basic optical imaging, unlike the embodiments described herein may not allow for accuracy of detection of error, detection of specific types of errors, or sensitivity, certainty, speed, and ease of use.

Accordingly, certain embodiments herein relate to methods and systems that allow detection of specific types of error in a rapid and definitive manner, based on optical images of one or more layers of one or more objects (also referred to herein as a "part") being built during an AM process. In some embodiments, one or more optical images are acquired before or after recoating of build material during an AM process. In some embodiments, gray values in the pixels of the optical images are compared with reference gray values in order to determine whether there are errors (e.g., at portions of the part corresponding to the pixels). In some embodiments, the methods and systems may detect errors such as warpage and dross formation.

Some aspects of the present disclosure relate to systems and methods for detecting an error in an additive manufacturing process based on determining whether gray values of pixels in one or more optical images of one or more layers of build material during building of a part satisfy a threshold. Some aspects of the present disclosure relate to systems and methods for detecting an error based on comparing a distribution of gray values of pixels in one or more optical images to a distribution of gray values of pixels in a reference image.

For example, some systems and methods may be used for detecting warpage or dross formation in a part during an additive manufacturing process such as SLM.

In certain embodiments, optical images of a layer of build material may be captured using an image capture device (e.g., optical camera). The image capture device may be coupled (via wire or wirelessly) to a computing device that receives the optical images from the image capture device. In certain embodiments, the optical images are images in the visible region of the electromagnetic spectrum (approximately 390-700 nm). In some embodiments, illumination light from a light source (e.g., one or more bulbs, lights, etc.) is applied to the layer of build material to illuminate the build material during capture of the optical images. In some embodiments, the illumination light may be directed onto the build material surface from one or more directions, for example, from the front so that light rays are perpendicular to the movement of the coater and in a plane parallel with the build material surface; from the side so that light rays are parallel to the movement of the coater and in a plane parallel with the build material surface; and/or from the top so that light rays are perpendicular to the plane parallel with the build material surface.

In some embodiments, the image capture is calibrated. For example, in some embodiment, a calibration grid is provided. In some embodiments, a calibration grid includes small circles on a rectangular grid (with regular spacing dX in X and dY in Y direction) on the build platform. An image of this calibration grid may be taken with the image capture device. Based on this image, a calibration algorithm determines a linear transformation matrix to compensate for the perspective error. Non-linear effects such as barrel or pincushion distortion may be negligible, but can also be corrected with this method. In some embodiments, since both the image capture device and the build platform have fixed positions on the additive manufacturing device, the same linear transformation matrix can be used to perform the calibration.

In some embodiments, light calibration is performed to compensate for uneven gray values (e.g., due to illumination being greater near the light source). For example, an image of the build material may be captured by the image capture device with uneven light distribution present or one or more light sources. Noise (e.g., high frequency noise) may be filtered from the captured image with an averaging filter. The resulting images may be referred to as shading patterns. For subsequent images captured by the image capture device, they may be light calibrated by dividing the gray value of a pixel in the image by the gray value of the corresponding pixel of the corresponding shading pattern. Then the pixel gray values are rescaled by multiplying with the mean gray value of the shading pattern. Therefore, in some embodiments, optical images as discussed herein may refer to light calibrated optical images in certain embodiments.

The pixels of the captured images may correspond to or be converted to gray values (e.g., by measuring or calculating gray values). For example, FIG. 1 illustrates an example of a captured image of build material where the pixels correspond to gray values. As seen, different pixels have different shades (darker or lighter) of gray values for pixels.

As discussed, some errors (e.g., warpage) in the AM process may occur where build material projects above its intended plane (e.g., above the layer of build material before or after recoating). Depending on the direction of illumination of the layer such errors may cause different optical patterns in the layer. For example, where the illumination comes from the top, such errors may be seen as lighter than the surrounding build material, and therefore may have a lighter gray value. In another example, where the illumination comes from the side, such errors may cast a shadow on the build material near the error that can be seen as darker than the surrounding build material, and therefore may have a darker gray value. Therefore, in certain embodiments, the gray value of pixels of an optical image may be used to determine if there is an error in an AM process, and further may be used to determine where the error has occurred in a layer of a build. For example, the gray values of pixels of one or more optical images corresponding to one or more layers of a build may be compared to a reference set of gray values of pixels. If the gray values of pixels of the one or more optical images are not within a threshold value of the reference set of gray values of pixels (e.g., darker or lighter depending on illumination), the computing device may determine an error has occurred as discussed herein.

Figure 2:
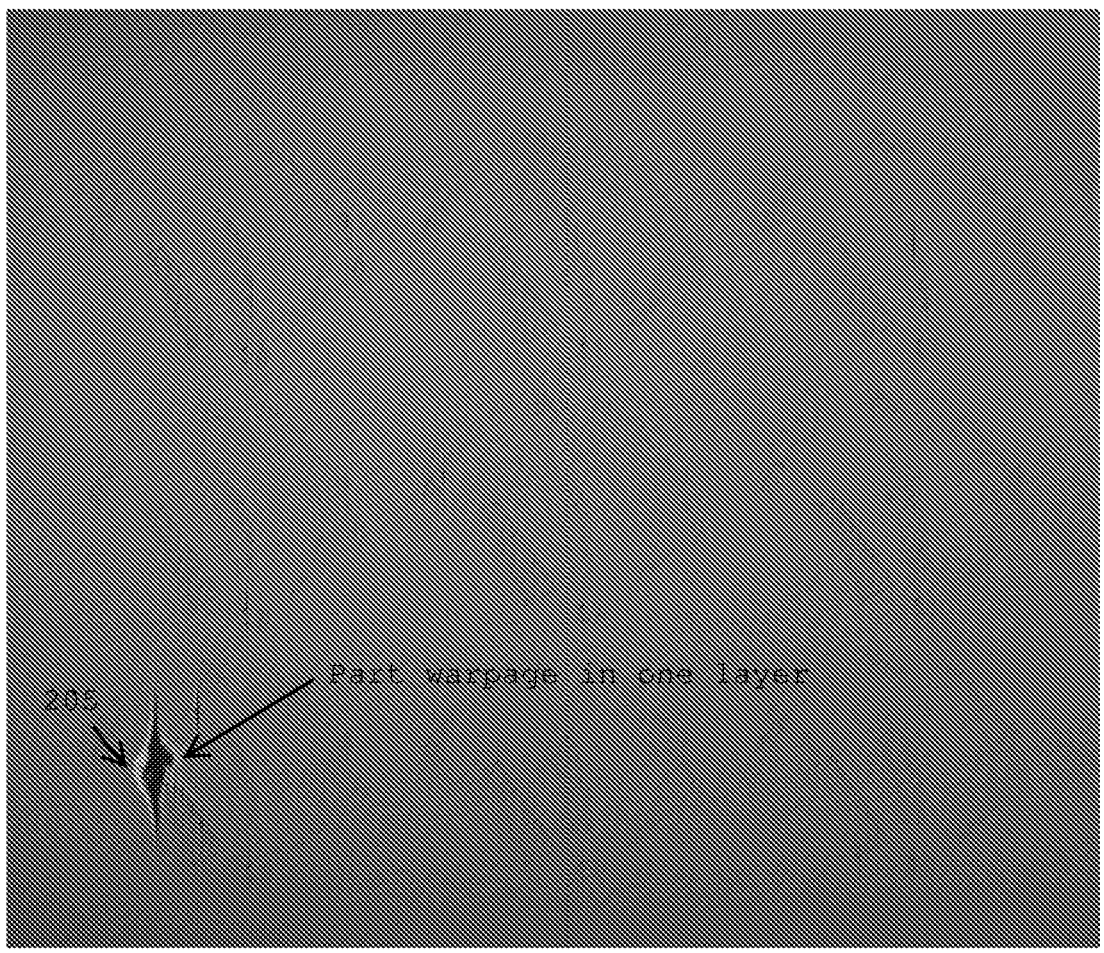
FIG. 2 illustrates an example of a captured image of build material with an error.

For example, FIG. 2 illustrates an example of a captured image of build material with an error at area 205. As seen, the area 205 has gray values that are different from the gray values of the surrounding build material.

In some embodiments, at least one optical image may be acquired from each layer before or after recoating. In some embodiments, more than one optical image of each layer is acquired. Thus, "an optical image" of a layer as described herein may refer to more than one optical image of the same layer, for example, 2, 3, 4, 5, 10 or more optical images of the same layer. The optical images of the same layer may be analyzed individually, or multiple optical images of the same layer may be compiled and analyzed together so that one consolidated image represents the individual layer.

In some embodiments, optical images may be acquired for the layers that will be analyzed. In some embodiments, a single layer is analyzed. In some embodiments, at least 2 layers are analyzed. In some embodiments, the method comprises acquiring a first optical image of a first layer before or after recoating and a second optical image of a second layer before or after recoating. In some embodiments, the method further comprises acquiring an optical image of each of any additional layers before or after recoating. Accordingly, in some embodiments, the method comprises acquiring an optical image of each of n layers of the part before or after recoating. For example, the method may comprise acquiring a first optical image of a first layer after recoating, acquiring a second optical image of a second layer after recoating, acquiring a third optical image of a third layer after recoating, and so on until an optical image has been acquired of each layer that will be analyzed. The minimum number of layers (and corresponding optical images) to be analyzed according to the methods herein may be 1 or may be 2. In some embodiments, optical images are acquired of each of 1, 2, 5, 10, 15, 20, 25, 30, 35, 40, 45, 50, 60, 65, 70, 75, 80, 85, 90, 95, 100, 150, or 200 layers. The number of layers analyzed may depend on the thickness of each layer (e.g., for SLM processes, a layer is typically around 30 µm), and the height of the part or parts that are built. For example, a part with a height of 30 cm may be built from about 10000 layers, each layer having a thickness of 30 µm. In this example, an optical image of each of 2 layers may be acquired and/or optical images of each of more than 2 layers may be acquired, up to a maximum of 10000 layers. In some embodiments, an optical image is acquired of each and every layer of the part before or after recoating. In certain embodiments, an optical image is acquired of a subset of layers of the part before or after recoating.

In some embodiments, all layers corresponding to the part(s) may be analyzed after the build, or select layers corresponding to a portion of the part may be analyzed during the build. In certain embodiments, portions of one or more layers (e.g., corresponding to a part of multiple parts, or a portion of a part (e.g., overhang portion) may be analyzed during the build. In certain embodiments, the layers analyzed are adjacent to each other. Thus, the first layer and the second layer may follow consecutively, and any additional layers analyzed may follow consecutively after the second layer. In some embodiments, the layers are not adjacent to each other. For example, the first layer and the second layer may not follow consecutively, and any additional layers will not follow consecutively after the second layer or after each other. In certain embodiments, a plurality of layers are adjacent to each other, while at least one layer is not adjacent to the others. Accordingly, one layer may be analyzed and/or a plurality of layers (e.g., a stack or cluster of a plurality of layers) may be analyzed, while one or more intervening layers are not analyzed. Layers may be selected randomly for analysis, such that clusters of layers are sampled at random intervals during the build of the part. Specific layers may be selected for analysis in portions of the part where an error (e.g., warpage) is likely to be found.

As discussed, the gray values of one or more optical images may be analyzed to determine if there is an error in the build process by comparing the gray values of the one or more optical images to a reference set of gray values of pixels, which may be referred to as a reference image. In some embodiments, the reference image is an image of a layer before or after recoating that has no error (e.g., warpage).

For example, the reference image may be an image of a layer of build material (e.g., powder bed) before or after recoating, or the image of a part in which there is no warpage. The part has no warpage, and therefore the layer has an expected uniformity. In some embodiments, the reference image is an image of the layer before any laser scanning has taken place. In some embodiments, the image capture device and illumination light are calibrated before capturing any images, and the reference image and images of layers before or after recoating are taken by the same image capture device/illumination light under the same calibration conditions (e.g., direction of light, direction of image capture, etc.). In some embodiments, a universal reference image or model image may be used, which represents a universal non-error condition for comparison with any layer and/or any part(s). In some embodiments, the reference image may be specific to particular part(s) and/or layer(s).

Figure 3:
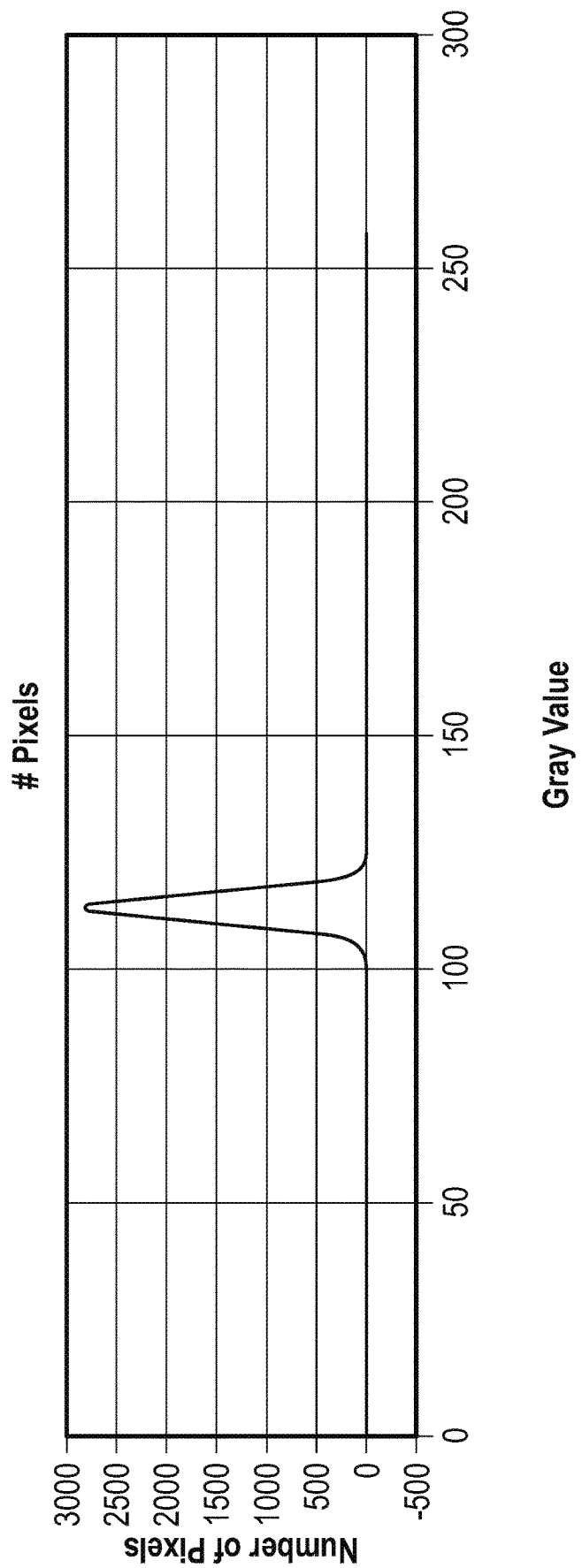
FIG. 3 illustrates a graph of a histogram of an example of gray values for pixels in a reference image.

In some embodiments, a histogram is created of gray values for the pixels in the reference image, and an average gray value ($\mu$) and a standard deviation (s) from the average gray value may be determined. For example, FIG. 3 illustrates a graph of a histogram of gray values for pixels in a reference image. The X-axis represents the gray value, and the Y-axis represents the number of pixels with the gray value. As seen in FIG. 3, for the reference image, the majority of pixels have gray values centered around a single value, indicative of a mostly uniform gray value over all the pixels. Statistical calculations may be used to determine a threshold gray value based on $\mu$ and s. The threshold gray value may be a value either above or below which any gray value will be considered significant and/or a positive indicator of an error (e.g., warpage). For example, the threshold gray value may be a gray value which would be statistically unlikely to occur in a reference image. In some embodiments, a threshold gray value may be based on a multiple of s. In some particular embodiments, the threshold gray value may be based on a calculation involving at least three (3) times s. In other embodiments, the threshold gray value may be based on a calculation involving 4, 5, or 6 times s. In certain embodiments, the threshold gray value may be the average $\mu$ minus three (3) times s (TV=$\mu$−3*s). In certain embodiments, the threshold gray value may be the average $\mu$ minus 3, 4, 5, or 6 times s. In certain embodiments, the threshold gray value may be the average $\mu$ plus three (3) times s (TV=$\mu$+3*s). In certain embodiments, the threshold gray value may be the average $\mu$ plus 3, 4, 5, or 6 times s. In particular, as discussed, lighter or darker gray values may be indicative of an error (e.g., depending on lighting, etc.).

In some embodiments, per-pixel operations are used to analyze the optical images corresponding to layers of build material acquired during a build of an object. For example, individual pixels of one or more optical images may be analyzed by a computing device to determine if the pixel's gray value satisfies a threshold gray value (e.g., based on a reference image). In some embodiments, if the gray value of the pixel does not satisfy the threshold for one or more layers, the computing device determines there is an error in the object corresponding to the pixel and may alert a user, stop the build, or take other appropriate action, such as discussed herein. In some embodiments, each pixel in a layer may be given a binary value (e.g., 0 or 1) based on whether the pixel's gray value satisfies the threshold gray value, thereby generating a binary image for the layer. For example, if the pixel's gray value satisfies the threshold gray value the pixel may be assigned a first binary value (e.g., 0 or 1) and if the pixel's gray value does not satisfy the threshold gray value, the pixel may be assigned a second binary value (e.g., the other of 0 or 1). These binary pixel values may be used for visualization, to determine an error using optical images for multiple layers, etc., as discussed herein.

In some embodiments, if a single layer includes a pixel with a gray value that does not satisfy a threshold, the computing device determines there is an error. In some embodiments, if a single layer includes a threshold number of pixels with a gray value that does not satisfy a threshold, the computing device determines there is an error. In some embodiments, if a pixel has a gray value that does not satisfy a threshold across a threshold number of layers, the computing device determines there is an error. In some embodiments, if a threshold number of pixels have a gray value that does not satisfy a threshold across a threshold number of layers, the computing device determines there is an error.

Figure 4:
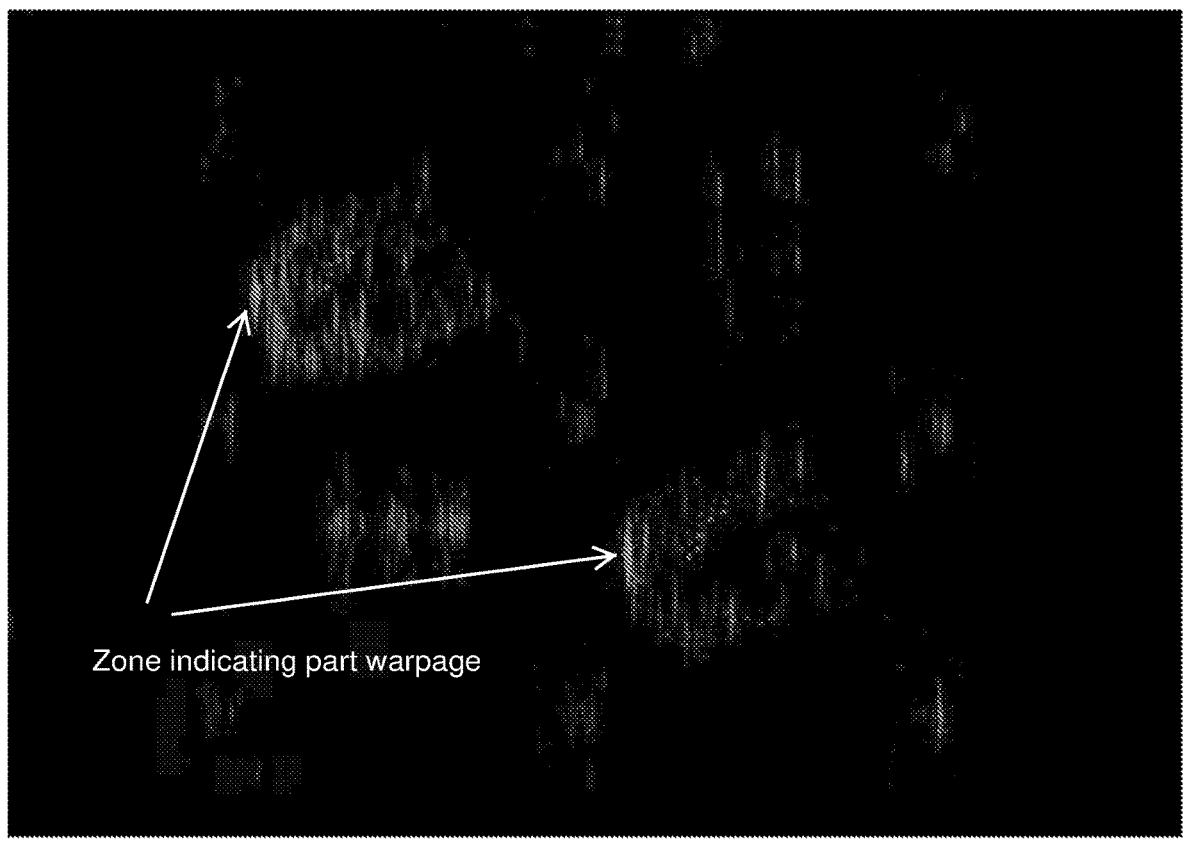
FIG. 4 illustrates an image corresponding to the sum of values of binary images of a stack of optical images.

For example, in some embodiments, the computing device collects, stores, and analyzes a stack of optical images (i.e., optical images of a plurality of layers), which may be referred to as pixelwise operations across multiple layers. In some such embodiments, each pixel in each of the optical images is analyzed, whereby for each pixel a sequence of gray values is constructed which shows the evolution of the gray value for that pixel over the whole stack of images (termed a sequence or a pixel sequence). In this sequence, characteristics can be derived such as the average pixel value, the standard deviation, the number of times the gray values fails to meet a threshold, the number of times it fails to meet a threshold in subsequent images, etc. Accordingly, the characteristics of a single pixel are followed over the stack of images. In some embodiments, the characteristics of every pixel is followed over the stack of images. In some embodiments, the characteristics of a subset of pixels (e.g. corresponding to one or more parts, a portion of a part, such as corresponding to an overhang, etc.) is followed over the stack of images. In some embodiments, a new image based on the stack of optical images is generated. The values of pixels of the new image may correspond to the minimal pixel value across the layers, average pixel value, standard deviation of gray values, the number of times that a pixel value failed to meet a threshold value, etc. In some embodiments, the minimal pixel area analyzed is smaller than or equal to the area of the smallest polygon that represents the part or a portion of the part. For example, FIG. 4 illustrates an image corresponding to the sum of values of binary images of a stack of optical images. The summed values are represented as gray scale images, with lighter values corresponding to areas of potential error (e.g., gray values that did not satisfy a threshold are represented by lighter values).

Figure 5:
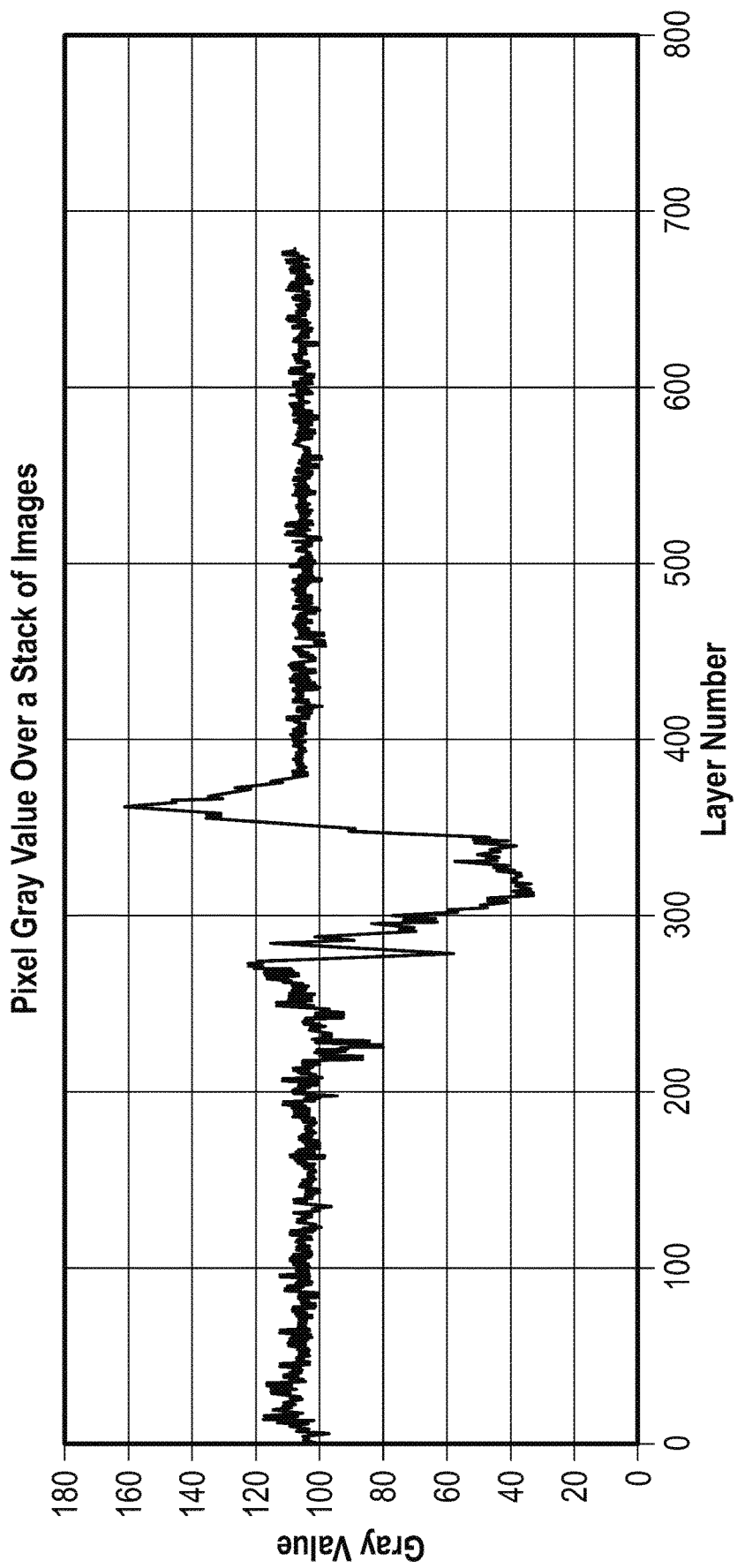
FIG. 5 illustrates a graph of an example of gray values for a pixel across a number of layers.

In some embodiments, analysis of the gray values for pixels across layers may be generated and displayed by a computing device as visualizations, such as graphs, images, etc., as discussed herein. For example, a graph of the gray values for each pixel may be plotted against layer number (e.g., as shown in FIG. 5). The gray values for each pixel are then compared with gray values of pixels from a reference image. As seen in FIG. 5, the X-axis represents the layer number, and the Y-axis represents the gray value for the pixel at each layer. As can be seen, for the particular pixel graphed. There are large variations from the average gray value of the pixel between layers 300-400, which may be indicative of an error.

Figure 6:
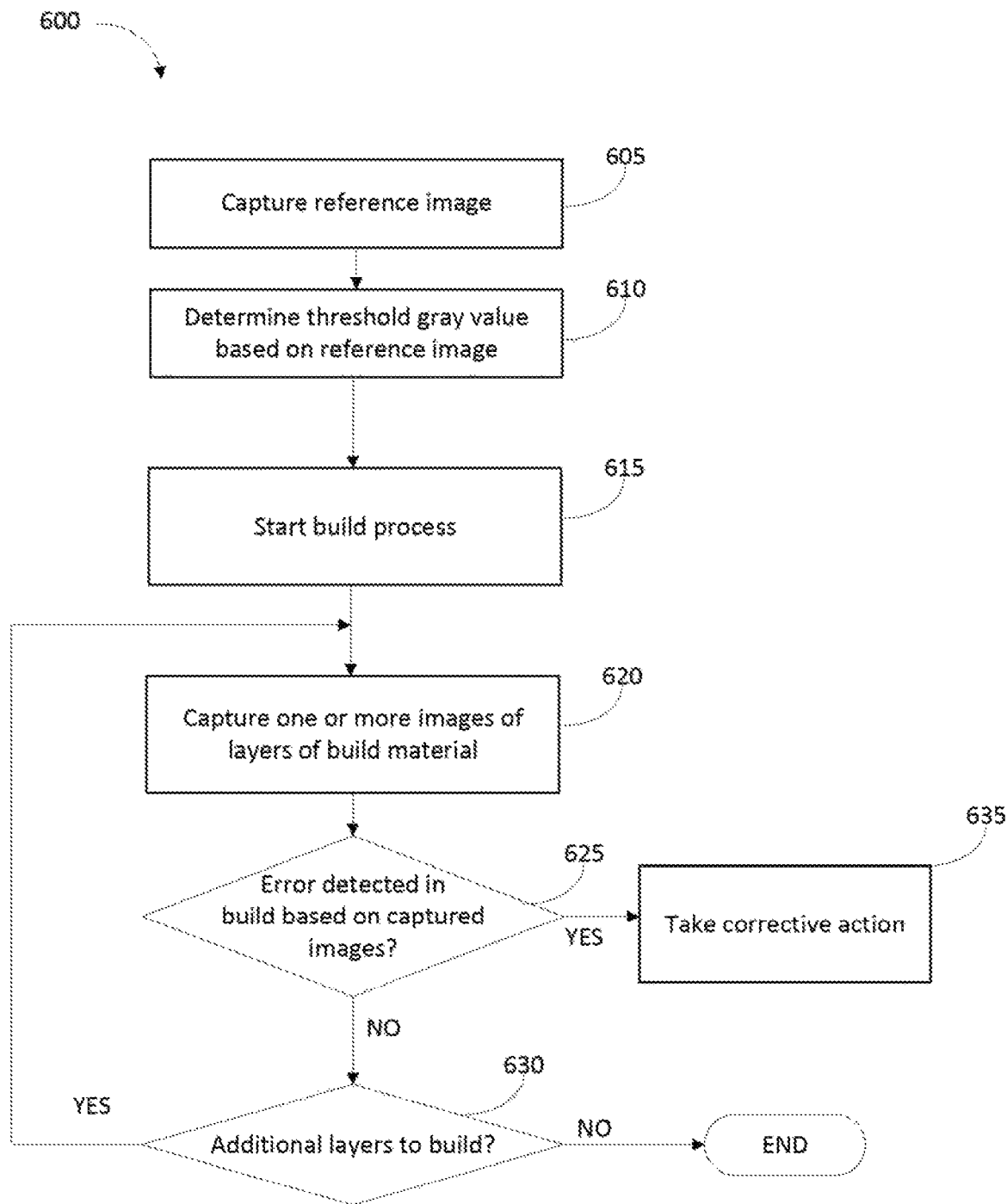
FIG. 6 illustrates a flowchart of an example process for detecting an error based on whether gray values of pixels satisfy a threshold.

FIG. 6 illustrates a flowchart 600 of an example process for detecting an error based on whether gray values of pixels satisfy a threshold. At 605, an image capture device captures a reference image of build material without errors. At 610, a computing device determines a threshold gray value based on the reference image. For example, the threshold gray value may be determined based on a standard deviation from an average gray value of the reference image. At 615, the build process of one or more parts is started. At 620, the image capture device captures one or more images of one or more layers of the build material before or after a recoating process during build of the parts. At 625, the computing device determines if there is an error in the parts. For example, the image capture device compares the captured images of layers of build material to the reference image. If any of the gray values of pixels (e.g., corresponding to one or more parts) in the images of the layers of build material (e.g., for a single layer or based on multiple layers as described herein) do not satisfy the threshold gray value, the computing device determines there is an error. If there is no error, at 630, the computing device continues the build process and determines if there are more layers to build and capture images for. If there are more layers to build and capture images for, the process returns to 625, otherwise the process ends. If there is an error, at 635, the computing device takes some action, such as alerting a user, logging data, stopping the build, continuing with the build, etc., as described herein.

In some embodiments, analysis of the gray values for pixels across a number of layers may be used to determine if there is an error in the build (e.g., at the location of a pixel). For example, in some embodiments, for each pixel sequence (i.e., the sequence of gray values of the corresponding pixel over the stack of images) the occurrence of pixels that do not satisfy a grey value threshold (e.g., with a value of 0 or 1, depending on implementation) in the binary images is compared to a predetermined boundary number indicative of an error (e.g., warpage) in a part. If a pixel does not satisfy a gray value threshold at least the boundary number of times over the number of layers, the computing device may determine an error has occurred. Otherwise, the computing device may determine an error has not occurred. In some embodiments, the predetermined boundary number may be equal to the specific number of times that a given pixel must have a value of 1 (or 0) in its binary images in order for the specific number to represent a true error (e.g., warpage) event. For example, a predetermined boundary number may be 2 in a particular system because a given pixel must not satisfy a threshold gray value at least 2 times (in at least 2 layers) in order to be considered an error. Or a predetermined boundary number may be 10, because any number below 10 may not be a true error event. In some embodiments, the predetermined boundary number is equal to the number of layers for which optical images are acquired. The predetermined boundary number may be lower than the number of layers for which optical images are acquired, for example, if optical images of 5000 layers are acquired but the predetermined boundary number is set at 35. The predetermined boundary number may be determined experimentally by comparing, for example, warped parts to non-warped parts, and determining how many times a given pixel does not satisfy a threshold gray value in the binary images when a part has warpage, as compared to the number of times a given pixel not satisfy a threshold gray value in the binary images when the part is not warped, or has another type of error. In certain embodiments, a predetermined boundary number is specific to warpage.

In some embodiments, a warpage event is characterized by a pixel subsequence (e.g., a subset of the pixel sequence) in which all of the pixels in the subsequence do not satisfy a threshold gray value, followed by a pixel subsequence in which all of the pixels do satisfy a threshold gray value.

In some embodiments, warpage can be distinguished from other errors in which a pixel in the pixel sequence does not satisfy a threshold gray value over a number of layers. For example, a damaged coater blade may create a pattern of stripes on the build material after recoating, but this would be observed throughout all layers. In contrast, warpage may be observed in a subset of layers, but not in other layers. In certain embodiments, warpage can be distinguished from noise in the system, or from a small number of events whose occurrence is less than the predetermined boundary number.

In some embodiments, there may be more than one predetermined boundary number, for example, for error (e.g., warpage) events of different sizes. A low predetermined boundary number such as 2 may correspond to a small error event. In some embodiments, a small error event may be permissible, if the quality requirements for the part will permit a small defect. A high predetermined boundary number such as 10 may correspond to a large error event. In some embodiments, a part may have error events of different sizes. Error events in non-critical areas may be permitted, for example if an error event occurs in a non-critical area that can be post-processed, such that the volume in which the error occurred can be removed by post-processing. Similarly, large error events may be permitted in noncritical areas. In contrast, large error events may not be permitted in critical areas (e.g., areas or zones that cannot be post-processed). Thus, the predetermined boundary number may be higher for noncritical areas than for critical areas of the part. In some embodiments, a build will be stopped if there is an error event in a critical area, while a build will not be stopped if there is an error event in a noncritical area. In some embodiments, the build will continue regardless of size or number of error events, but the information about the error gathered using the methods and systems described herein will serve as a report of the error in the part and/or the overall quality of the part.

In some embodiments, analysis of more than 1 layer increases sensitivity and specificity of the methods and systems described herein. In some embodiments, multiple binary images are combined into a single image. The single image represents the number of occurrences of 1 and 0 for each pixel in each of the individual layers. A single image may simplify the interpretation of the results by humans controlling the machine, allowing them to see at a glance the resulting part error in different areas across the build. It also may simplify comparing the production of parts over multiple builds.

In some embodiments, for every pixel sequence the computing device determines a Fast Fourier Transform (FFT) for the gray values of the pixels across the layers, which allows determining whether there are certain variations in the gray value sequence occurring more often than others. For instance, if there is a small error every second layer, the FFT will show a peak at the corresponding frequency. In some embodiments, non-natural variations in gray values are detected, using for instance the Statistical Process Control (SPC) rules from Western Electric on control charts. SPC allows detection of smaller changes in gray values which still fall within the threshold, but which show overall non-natural variations (either increases or decreases). These non-natural variations may have a determined cause, which may not be present in normal circumstances. In some embodiments, a lack of change in gray values (or distribution of gray values) from one layer to the next after recoating indicates errors. For example, if powder was not properly deposited, there may not be a difference in gray values between the layer before recoating and after recoating.

In some embodiments, the present methods and systems are used in a quality control process in order to monitor and control the AM process. Following detection of errors, such as warpage in SLM, feedback control mechanisms may be used to correct the error. In some embodiments, detection of warpage triggers remedial actions. In some embodiments, detection of warpage aborts the build.

In some aspects, additive manufacturing of overhang surfaces presents unique challenges, where dross formation occurs when overhang surfaces are manufactured.

Overhang surfaces (also called downfacing surfaces) may be surfaces of the part which form an angle with the horizontal plane that is smaller than a critical angle. In some embodiments, a critical angle is about 30°.

Various measures can be taken to prevent dross formation, like changing part orientations to minimize overhang, modifying support structures, and/or changing process parameters such as spot diameter, laser power, and scanning speed. In order to determine whether these measures are effective at preventing dross formation, and/or to determine whether dross formation has occurred, certain embodiments of methods and systems herein detect dross formation in an overhang surface of a part during the AM build. In particular, embodiments of systems and methods described for detecting an error in an additive manufacturing process based on determining whether gray values in one or more optical images of one or more layers of build material during building of a part satisfy a threshold may similarly be used for detecting dross formation. For example, optical images of one or more layers of build material may be captured as discussed, and the gray values of pixels of the optical images may be analyzed by the computing device to determine if there is dross formation.

For example, as discussed, dross formation may result in balling or droplets of build material that are separated in one or more layers. The balling or droplets of build material may appear as different gray values in an image. For example, depending on the direction of illumination of the layer such balls may cause different optical patterns in the layer. For example, where illumination light comes from the front or from the side during capture of the optical images, shadow lines around the balling that is characteristic of dross formation may be cast on the build material. For example, where the illumination comes from the top, such balls may be seen as lighter than the surrounding build material, and therefore may have a lighter gray value. Therefore, in certain embodiments, the gray value of pixels of an optical image may be used to determine if there a dross formations in an AM process, and further may be used to determine where the dross formations have occurred in a layer of a build.

For example, dross formations may appear as a pattern of pixel values (e.g., distribution of light and dark pixel values) in one or more layers corresponding to a pattern of balling.

Figure 7:
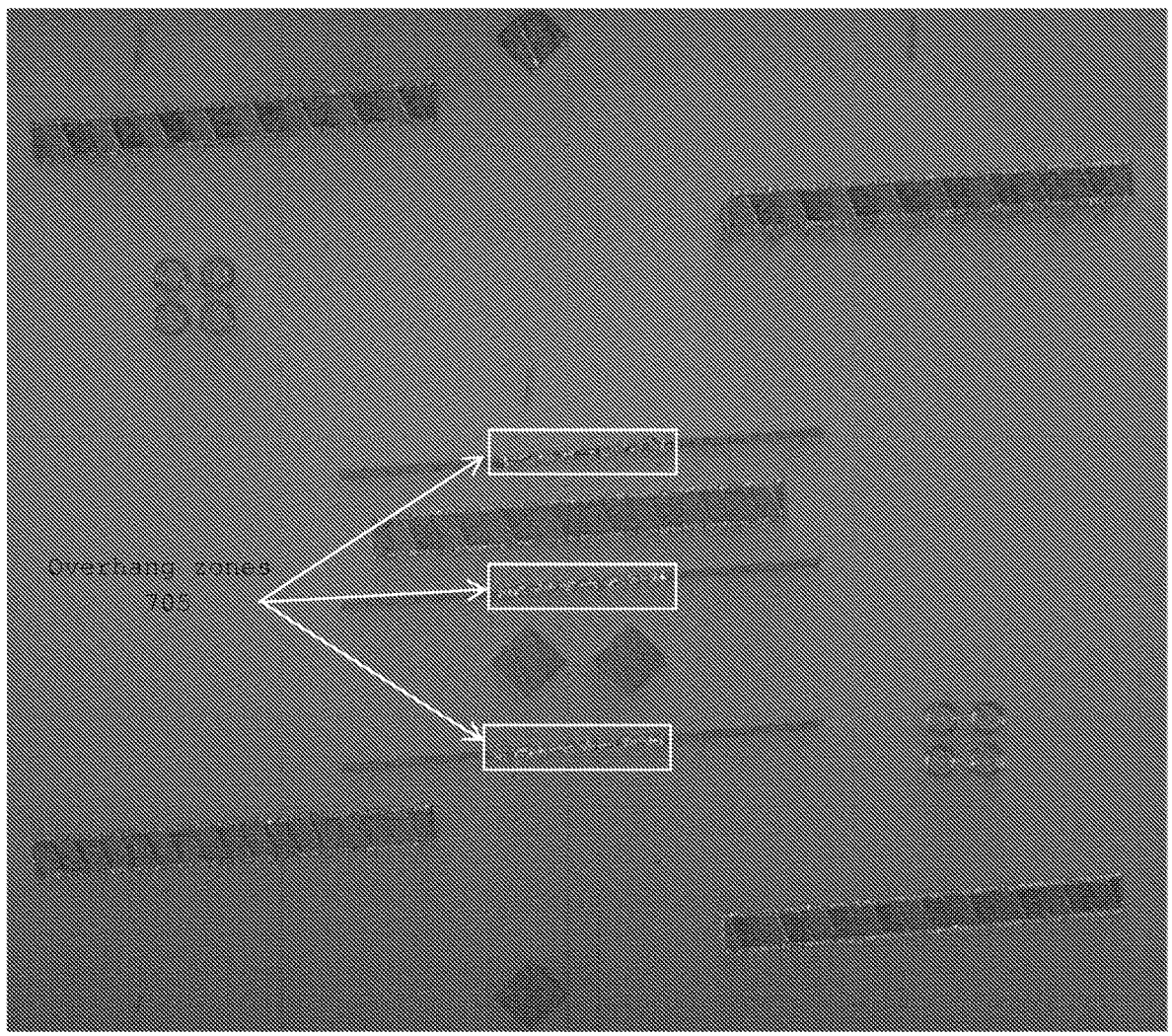
FIG. 7 illustrates an example of an image including dross formations.

FIG. 7 illustrates an example of an image including such dross formations. In particular, as seen in areas 705, there is a pattern of light and dark areas corresponding to dross formations. Accordingly, in some embodiments, a distribution of gray values in the captured image is compared to a reference distribution of gray values of pixels from a reference image. The distribution of gray values may be a normal (or Gaussian) distribution. In some embodiments, the reference distribution of gray values from a reference image corresponds to an area of an optical image without an overhang region of a part.

For example, in some embodiments, the distribution of gray values for a single layer is compared to a reference distribution. The reference distribution may have gray values concentrated over a smaller set of values than for a distribution corresponding to a dross formation. In some embodiments, dross formation is reflected by a change in the distribution of gray values of pixels in the overhang zone as compared to the distribution of gray values of pixels in the reference zone. The change in distribution of the gray values of pixels in the zones may be change in the standard deviation of the distribution and/or a shift in the average of the distribution.

Figure 8:
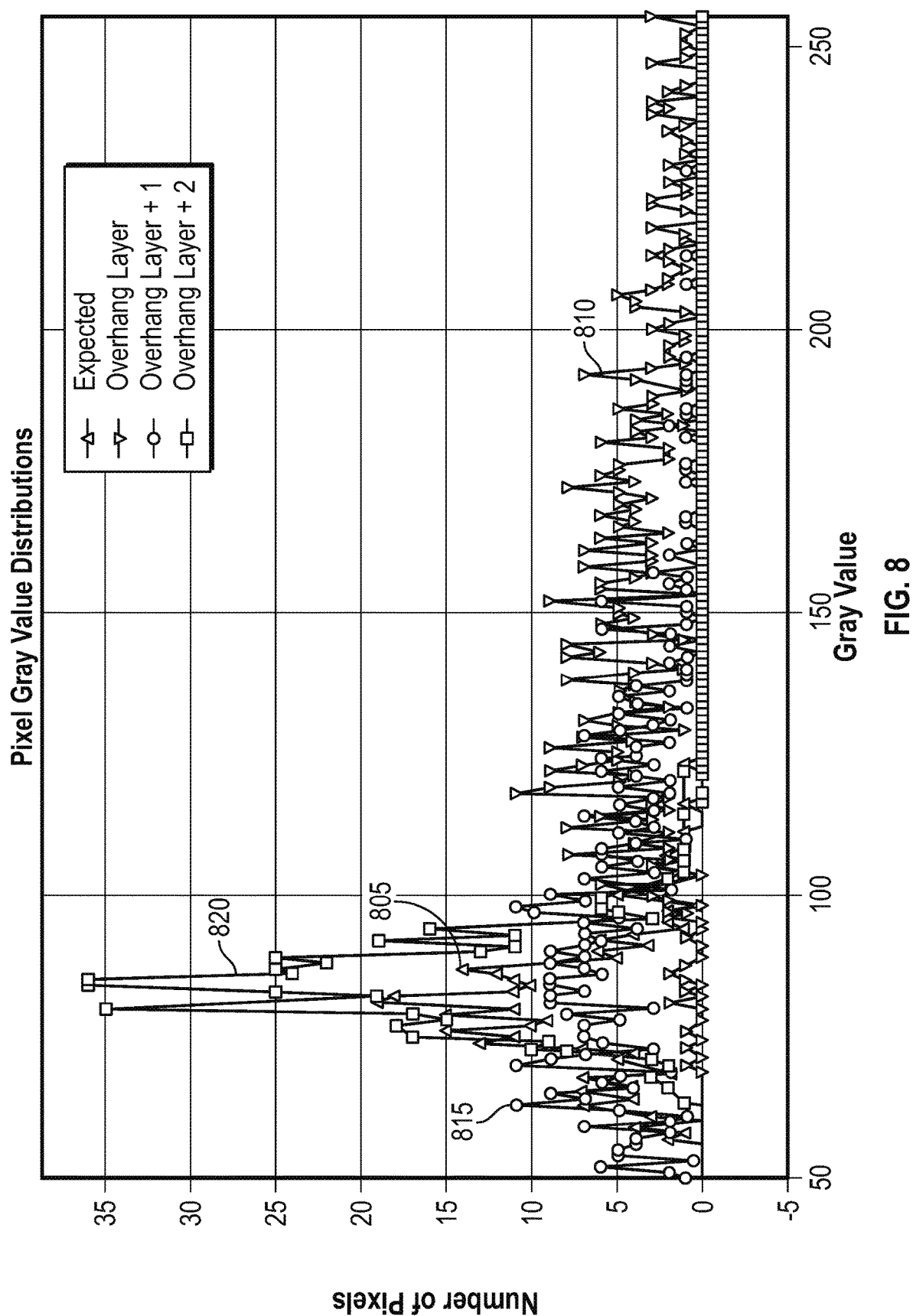
FIG. 8 illustrates an example of a graph of a distribution of gray values for pixels.

FIG. 8 illustrates an example of a graph of such a distribution of gray values of pixels. In particular, the X-axis represents the gray values for the pixels, and the Y-axis represents the number of pixels with the gray values. Line 805 represents the expected distribution of gray values without a dross formation. As seen, the gray values of the pixels are mostly centered around a single gray value. Line 810 represents the distribution of gray values for an overhang layer with dross formations. As seen, the gray values are distributed over a variety of values. Line 815 represents the distribution of gray values for a layer above an overhang layer. As seen, the gray value distribution is less than that of line 810, but still may have some dross formation. Line 820 represents the distribution of gray values for a layer two layers above an overhang layer. As seen, the gray value distribution is closer to that of line 805, and there may no longer be dross formations. Accordingly, in some embodiments, the distribution of pixel values may be monitored for multiple layers, and if the dross formations diminish over subsequent layers, the computing device may determine the error is minimal and continue with the build process.

In some embodiments, dross formation detection may only be performed where there are overhangs in the build. In particular, the computing device may determine in which layers, and which portions of layers, overhangs occur and perform dross formation detection (e.g., comparison of gray value distributions) in those regions. For example, overhang surfaces may correspond to only a portion of a part, and these surfaces may be identified within specific layers. In some embodiments, zones in the optical image which correspond to the overhang surfaces may be identified by applying a mask to the optical image of a layer. The mask may correspond to a slice in the CAD file of the part or in the job file. For example, in some embodiments, starting from the CAD files of the parts visible in a slice, the computing device generates a picture of a virtual layer that has values of 2 where there is an overhang zone in the layer (thus the zone has no material in the previous layer), 1 where there is a non-overhang zone in the layer (thus having material in the previous layer), and 0 where there is no material. This picture may be superimposed onto the optical image of the corresponding layer, which is acquired after scanning.

In some embodiments, gray values are measured for the pixels in those zones which correspond to the overhang surfaces. Gray values for at least three (3) pixels may be measured in the zone. In some embodiments, gray values are measured for 3, 4, 5, 6, 7, 8, 9, 10, or more pixels. In some embodiments, gray values are measured for 4, 9, 16, 25, or 36 pixels. In some embodiments, the minimal pixel area is smaller than or equal to the area of the smallest polygon that represents the zone or a portion of the zone.

Figure 9:
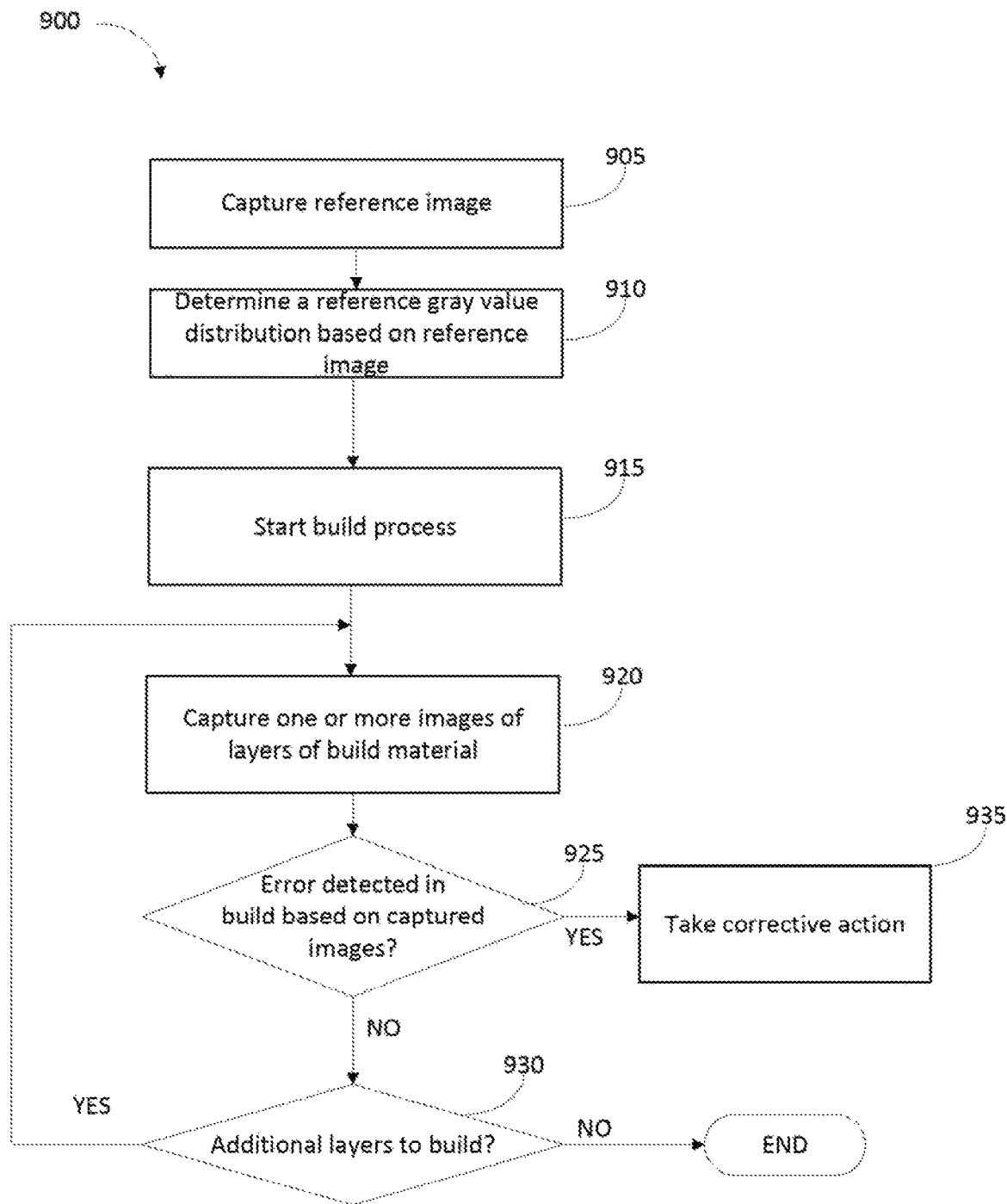
FIG. 9 illustrates a flowchart of an example process for detecting an error based on whether a distribution of gray values of pixels satisfies a threshold distribution.

FIG. 9 illustrates a flowchart 900 of an example process for detecting an error based on whether a distribution of gray values of pixels satisfies a threshold distribution. At 905, an image capture device captures a reference image of build material without errors. At 910, a computing device determines a reference gray value distribution based on the reference image. For example, the reference gray value distribution may be a Gaussian distribution of gray values. At 915, the build process of one or more parts is started. At 920, the image capture device captures one or more images of one or more layers of the build material before or after a recoating process during build of the parts. At 925, the computing device determines if there is an error in the parts. For example, the image capture device compares the captured images of layers of build material to the reference image. If the distribution of gray values of pixels (e.g., corresponding to one or more parts) in the images of the layers of build material (e.g., for a single layer or based on multiple layers as described herein) is different than the reference distribution by a threshold (e.g., the standard deviation of the distribution does not satisfy a threshold deviation from the standard deviation of the reference distribution), the computing device determines there is an error. If there is no error, at 930, the computing device continues the build process and determines if there are more layers to build and capture images for. If there are more layers to build and capture images for, the process returns to 925, otherwise the process ends. If there is an error, at 935, the computing device takes some action, such as alerting a user, logging data, stopping the build, continuing with the build, etc., as described herein.

In some embodiments, the type of error to be detected determines whether optical images are taken before or after recoating. For example, to detect warpage, optical images may be taken after recoating, whereas to detect dross, optical images may be taken after scanning but before recoating.

In some embodiments, the present methods and systems are used in a quality control process, in order to monitor and control the AM process. Following detection of errors, such as dross formation in overhang surfaces in SLM, feedback control mechanisms may be used to correct the error. In some embodiments, detection of dross formation triggers remedial actions. In some embodiments, detection of dross formation aborts the build. In some embodiments, the quality control process is a statistical process control (SPC). In some embodiments, Western electric rules are applied to detect non-random conditions on control charts.

In some embodiments, if there are multiple parts/support structures being built, the parts (e.g., and their corresponding support structures) may be individually monitored for errors by the computing device utilizing the techniques described herein. For example, using the original CAD data used to create a job file for manufacturing multiple parts, it is possible to isolate/identify the pixels that belong to each part. Other techniques may also be used to select/filter portions of the captured images to monitor. Accordingly, if only some part of the multiple parts is determined to have an error, the computing device may take remedial actions accordingly. For example, if some parts do not have an error, the computing device may continue the build. In some embodiments, the computing device may continue the build of parts without an error, but stop building additional layers for parts with an error.

In some aspects, individual parts may be monitored by monitoring the pixels that belong to each part and further a small area around the pixels that may be referred to as a bounding box. For example, all pixels within a threshold distance (e.g., in the X, Y, or Z direction) of the part may be monitored. In some embodiments, different threshold distances may be used in the X, Y, or Z directions. For example, since errors typically affect layers above and below the one where they occurred, a smaller threshold distance may be used for X and Y, but a larger one for the Z direction.

In some embodiments, in addition or alternative to a computing device detecting errors based on the gray value of pixels, information about gray values of pixels for layers may be presented in a visual format for ease of use by a user of a computing device.

Figure 10:
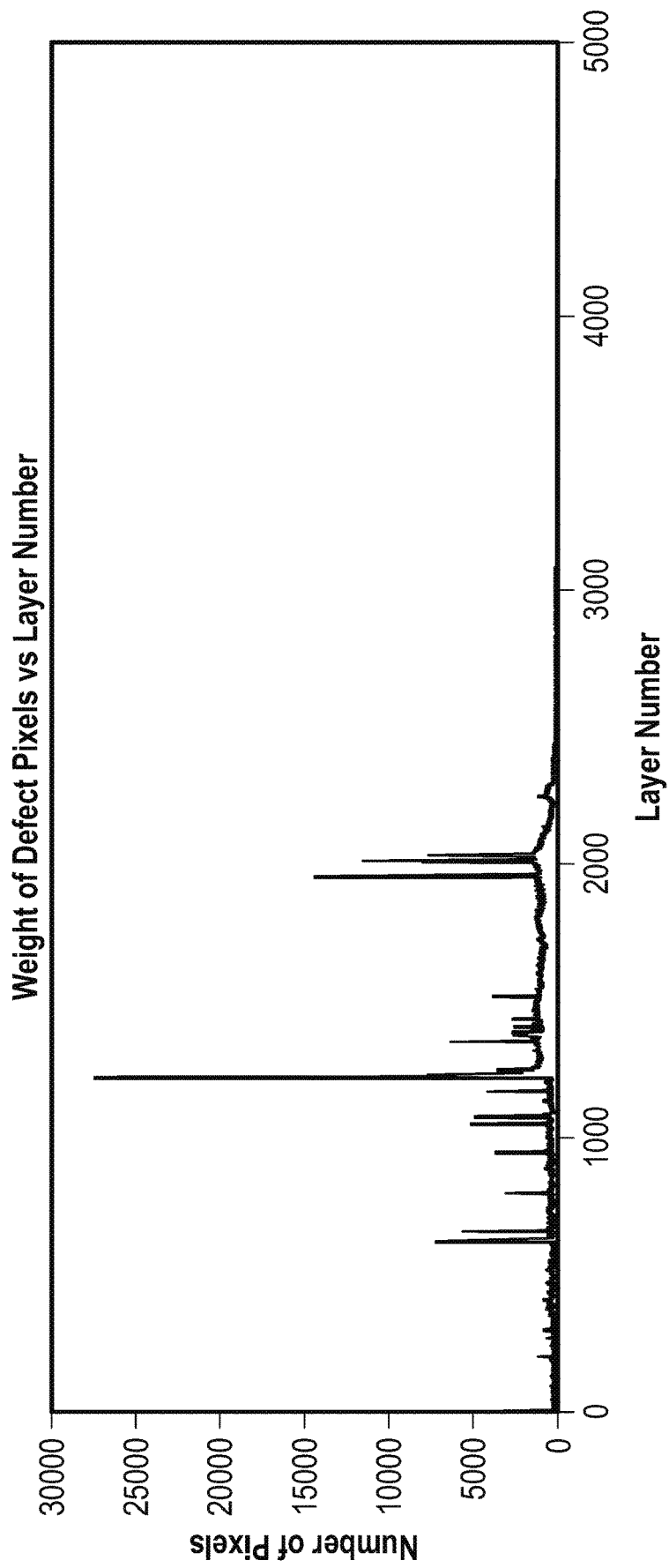
FIG. 10 illustrates an example of a graph of the number of pixels with potential errors per layer of build material.

For example, FIG. 10 illustrates an example of a graph of the number of pixels with potential errors per layer of build material that may be generated and displayed by a computing device. The X-axis represents the number of each layer, and the Y-axis represents the number of pixels that do not satisfy a gray value threshold. Such a graph may show if errors are localized (e.g., to one or more layers) or the severity of errors (e.g., the surface area affected of a given layer). For example, a distribution of values along the X-axis indicates error localization, and the Y-axis value indicates severity of errors.

In some embodiments, binary images of the optical images may be combined and represented as grayscale, black and white, or false-color images in 2D to show a view (e.g., top view) of where errors have occurred in a build volume. For example, the color or darkness of an area may correspond to the likelihood there is an error in the area.

In some embodiments, stacks of optical images (e.g., binary images) may be visualized as a 3D rendering (e.g., in color, black and white, grayscale) and similarly represent likelihood of an error in a volume of the build material. In some embodiments, volume rendering can be used to visualize the 3D rendering. In some embodiments, the stack can be converted into a 3D model (e.g., using a marching-cubes algorithm). For example, FIG. 10A illustrates an example of individual optical images 1005 that are stacked to form a stack of optical images 1010.

Figure 10B:
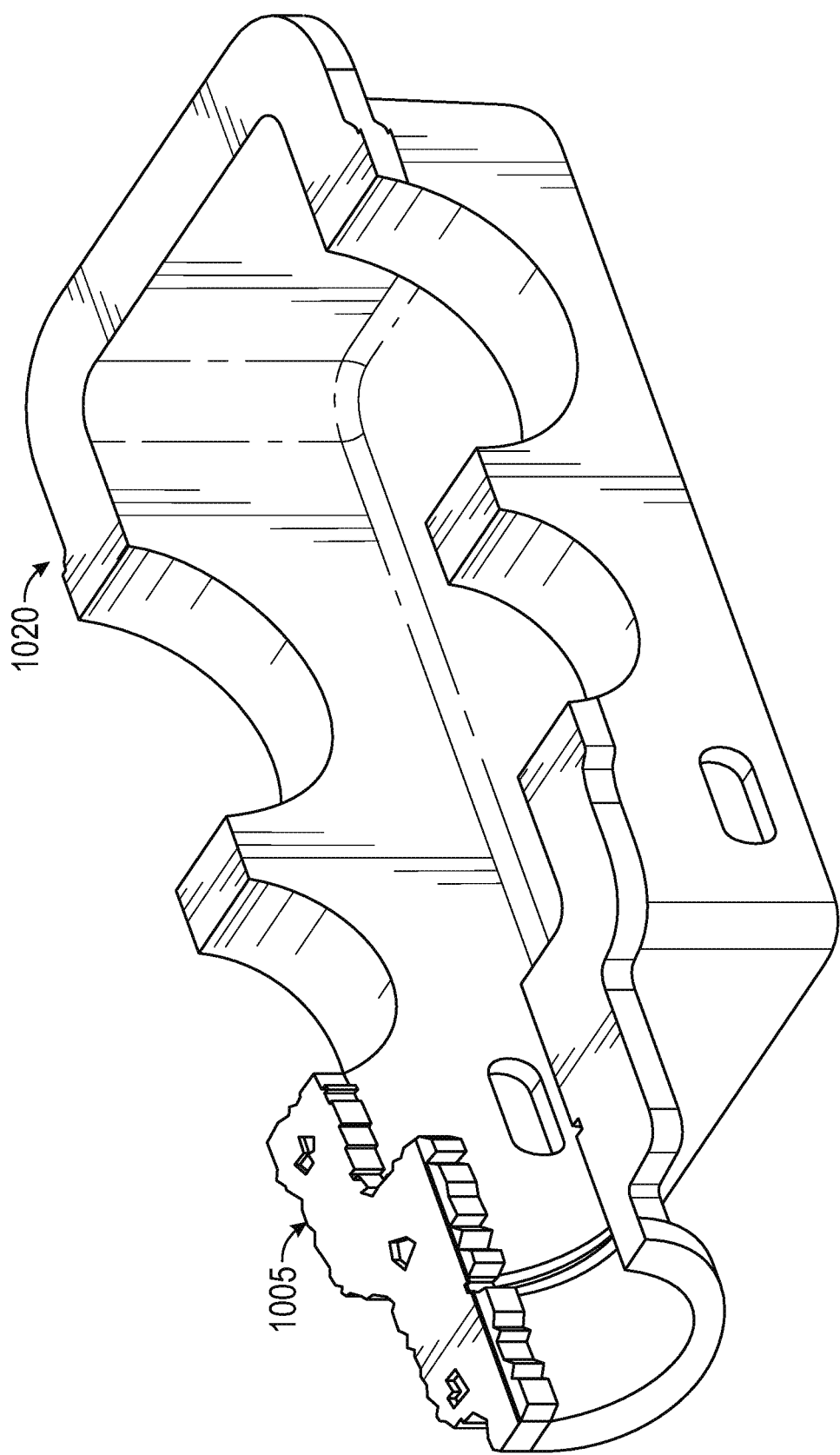
FIG. 10B illustrates an example of a representation of optical images overlaid onto a 3D representation of a part.

In some embodiments, the representations of the optical images may be overlaid onto 2D or 3D representations of parts to better indicate where an error has occurred in the part. For example, FIG. 10B illustrates an example of a representation of the optical images 1005 overlaid onto a 3D representation of a part 1020.

In some embodiments, the visualizations are for the entire build. In some embodiments, the visualizations are limited to certain parts. In some embodiments, the visualizations are for a finished build. In some embodiments, the visualizations are for a build in progress.

Figure 11:
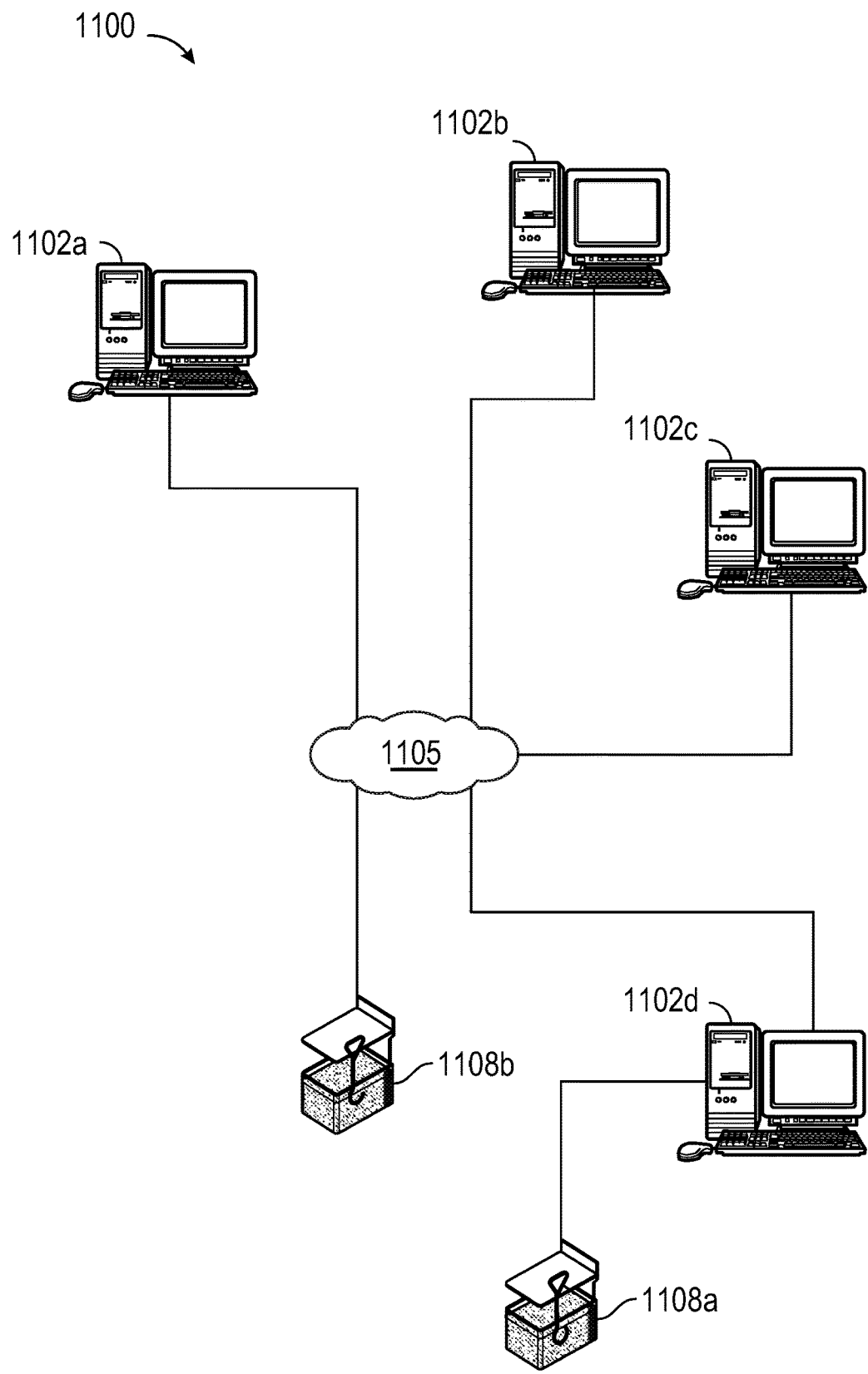
FIG. 11 is an example of a system for designing and manufacturing 3D objects.

Embodiments of the invention may be practiced within a system for designing and manufacturing 3D objects. Turning to FIG. 11, an example of a computer environment suitable for the implementation of 3D object design and manufacturing is shown. The environment includes a system 1100. The system 1100 includes one or more computers 1102a-1102d, which can be, for example, any workstation, server, or other computing device capable of processing information. In some aspects, each of the computers 1102a-1102d can be connected, by any suitable communications technology (e.g., an internet protocol), to a network 1105 (e.g., the Internet). Accordingly, the computers 1102a-1102d may transmit and receive information (e.g., software, digital representations of 3-D objects, commands or instructions to operate an additive manufacturing device, etc.) between each other via the network 1105.

The system 1100 further includes one or more additive manufacturing devices (e.g., 3-D printers) 1108a-1108b. As shown the additive manufacturing device 1108a is directly connected to a computer 1102d (and through computer 1102d connected to computers 1102a-1102c via the network 1105) and additive manufacturing device 1108b is connected to the computers 1102a-1102d via the network 1105. Accordingly, one of skill in the art will understand that an additive manufacturing device 1108 may be directly connected to a computer 1102, connected to a computer 1102 via a network 1105, and/or connected to a computer 1102 via another computer 1102 and the network 1105.

It should be noted that though the system 1100 is described with respect to a network and one or more computers, the techniques described herein also apply to a single computer 1102, which may be directly connected to an additive manufacturing device 1108. Any of the computers 1102a-1102d may be configured to function as the computing device described with respect to FIGS. 1-10. Further, any of the computers 1102a-1102d may be configured to perform the operations described herein, including the operations described with respect to FIGS. 6 and 9.

Figure 12:
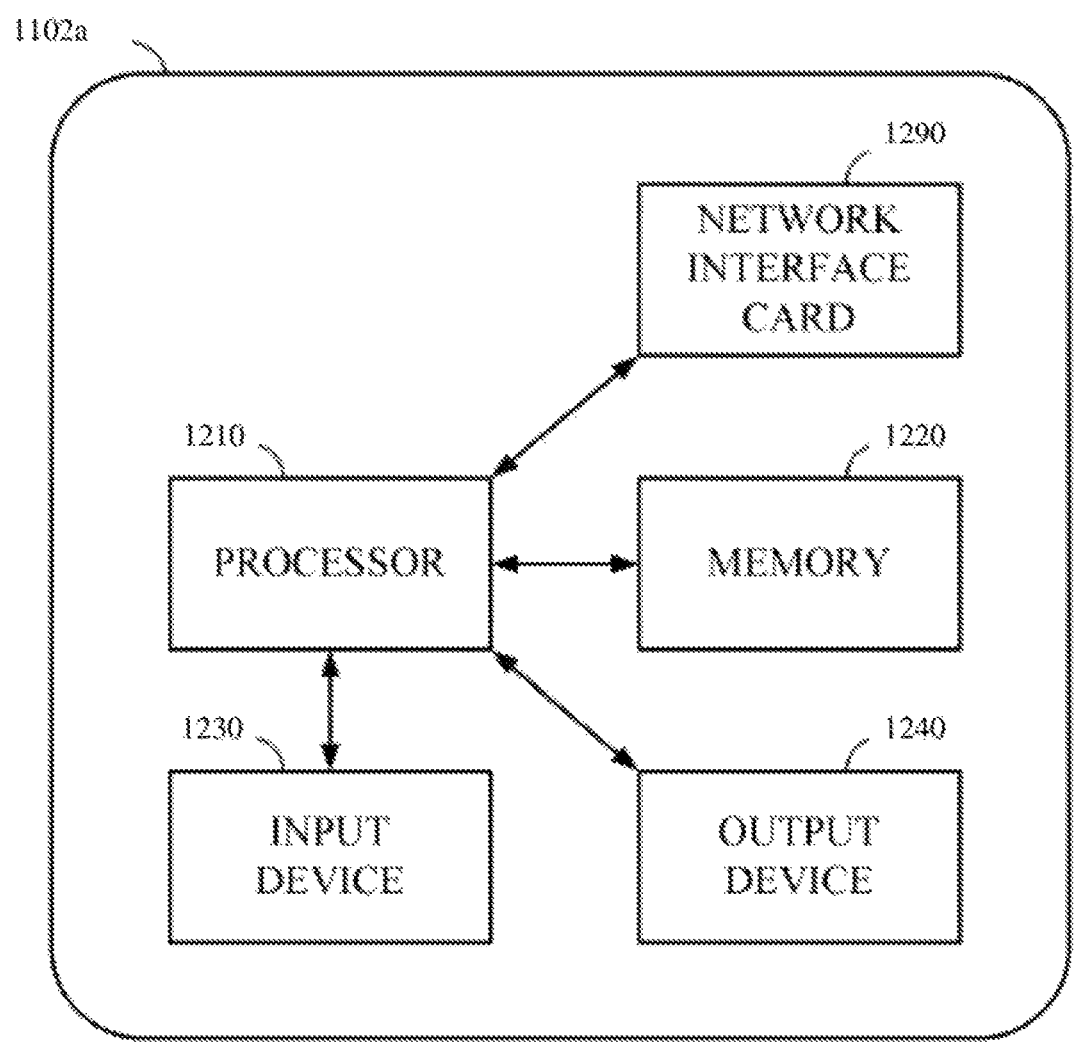
FIG. 12 illustrates a functional block diagram of one example of the computer shown in FIG. 11.

FIG. 12 illustrates a functional block diagram of one example of a computer of FIG. 11. The computer 1102a includes a processor 1210 in data communication with a memory 1220, an input device 1230, and an output device 1240. In some embodiments, the processor is further in data communication with an optional network interface card 1290. Although described separately, it is to be appreciated that functional blocks described with respect to the computer 1102a need not be separate structural elements. For example, the processor 1210 and memory 1220 may be embodied in a single chip.

The processor 1210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 1210 can be coupled, via one or more buses, to read information from or write information to memory 1220. The processor may additionally, or in the alternative, contain memory, such as processor registers. The memory 1220 can include processor cache, including a multi-level hierarchical cache in which different levels have different capacities and access speeds. The memory 1220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 1210 also may be coupled to an input device 1230 and an output device 1240 for, respectively, receiving input from and providing output to a user of the computer 802a. Suitable input devices include, but are not limited to, a keyboard, buttons, keys, switches, a pointing device, a mouse, a joystick, a remote control, an infrared detector, a bar code reader, a scanner, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, additive manufacturing devices, and haptic output devices.

The processor 1210 further may be coupled to a network interface card 1290. The network interface card 1290 prepares data generated by the processor 1210 for transmission via a network according to one or more data transmission protocols. The network interface card 1290 also decodes data received via a network according to one or more data transmission protocols. The network interface card 1290 can include a transmitter, receiver, or both. In other embodiments, the transmitter and receiver can be two separate components. The network interface card 1290, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

FIG. 13 illustrates a process 1300 for manufacturing a 3-D object or device. As shown, at a step 1305, a digital representation of the object is designed using a computer, such as the computer 1102*a*. For example, 2-D or 3-D data may be input to the computer 1102*a* for aiding in designing the digital representation of the 3-D object. Continuing at a step 1310, information is sent from the computer 1102*a* to an additive manufacturing device, such as additive manufacturing device 1108, and the device 1108 commences the manufacturing process in accordance with the received information. At a step 1315, the additive manufacturing device 808 continues manufacturing the 3-D object using suitable materials, such as a liquid resin. At a step 1320, the object is finally built.

These suitable materials may include, but are not limited to a photopolymer resin, polyurethane, methyl methacrylate-acrylonitrile-butadiene-styrene copolymer, resorbable materials such as polymer-ceramic composites, etc. Examples of commercially available materials are: DSM Somos® series of materials 7100, 8100, 9100, 9420, 10100, 11100, 12110, 14120 and 15100 from DSM Somos; ABSplus-P430, ABSi, ABS-ESD7, ABS-M30, ABS-M30i, PC-ABS, PC ISO, PC, ULTEM 9085, PPSF and PPSU materials from Stratasys; Accura Plastic, DuraForm, CastForm, Laserform and VisiJet line of materials from 3-Systems; the PA line of materials, PrimeCast and PrimePart materials and Alumide and CarbonMide from EOS GmbH. The VisiJet line of materials from 3-Systems may include Visijet Flex, Visijet Tough, Visijet Clear, Visijet HiTemp, Visijet e-stone, Visijet Black, Visijet Jewel, Visijet FTI, etc. Examples of other materials may include Objet materials, such as Objet Fullcure, Objet Veroclear, Objet Digital Materials, Objet Duruswhite, Objet Tangoblack, Objet Tangoplus, Objet Tangoblackplus, etc. Another example of materials may include materials from the Renshape 5000 and 7800 series. Further, at a step 820, the 3-D object is generated.

Various embodiments disclosed herein provide for the use of computer software being executed on a computing device. A skilled artisan will readily appreciate that these embodiments may be implemented using numerous different types of computing devices, including both general-purpose and/or special-purpose computing system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Various embodiments disclosed herein may be implemented using a computer or computer control system. A skilled artisan will readily appreciate that these embodiments may be implemented using numerous different types of computing devices, including both general-purpose and special-purpose computing-system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or nontransitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

What is claimed is:

1. A method for detecting deformation in one or more parts during an additive manufacturing process, comprising:
   receiving a first optical image of a first layer of build material on a build platform of an additive manufacturing device, the first layer of build material corresponding to the one or more parts being built using the additive manufacturing device before or after recoating of build material on the build platform;
   determining gray values for one or more pixels in the first optical image; and
   detecting deformation in at least one of the one or more parts being built using the additive manufacturing device based on at least one of the gray values in the first optical image compared to a threshold based on a first image of build material.

2. The method of claim 1, wherein the threshold comprises one of a threshold gray value for a pixel or a threshold deviation from a distribution of gray values.

3. The method of claim 1, further comprising identifying one or more zones in the first optical image corresponding to at least a portion of at least one of the one or more parts, wherein determining the gray values and detecting the deformation is performed only in the identified one or more zones.

4. The method of claim 3, wherein the one or more zones correspond to an overhang surface.

5. The method of claim 1, further comprising aborting a build of at least one of the one or more parts based on detecting the deformation.

6. The method of claim 1, further comprising:
   creating a first binary image indicative of whether each of the one or more pixels satisfy the threshold; and
   detecting the deformation based on the first binary image.

7. The method of claim 1, further comprising
   receiving one or more additional optical images of one or more additional layers of the build material corresponding to the one or more parts before or after recoating; and
   determining gray values for one or more pixels in each of the one or more additional optical images, wherein detecting the deformation is further based on gray values in the one or more additional optical images corresponding to the at least one gray value in the first optical image.

8. The method of claim 7, further comprising:
   creating a first binary image indicative of whether each of the one or more pixels satisfy the threshold;
   creating one or more additional binary images corresponding to the one or more additional optical images indicative of whether each of the one or more pixels in each of the one or more additional optical images satisfy the threshold; and
   detecting the deformation based on the first and the one or more additional binary images.

9. The method of claim 8, wherein detecting the deformation based on the first and the one or more additional binary images comprises determining for each plurality of corresponding pixels in the first and the one or more additional binary images a number of pixels for which a deformation was detected and comparing the number with a boundary number.

10. The method of claim 7, wherein the one or more pixels in the first optical image and in each of the one or more additional optical images correspond to a pixel sequence across a stack of images.

11. The method of claim 7, wherein the first optical image of at least a first layer of build material corresponds to the one or more parts after recoating and the one or more additional optical images of the one or more additional layers of the build material corresponds to the one or more parts after recoating.

12. The method of claim 11, wherein the deformation is warpage.

13. The method of claim 7, wherein the additional layers are adjacent layers.

14. The method of claim 7, wherein the additional layers are not adjacent layers.

15. The method of claim 1, further comprising generating and displaying a visual representation of the deformation, the visual representation comprising at least one of a false-color image, a graph, and a 3D model.

16. The method of claim 1, wherein the threshold comprises a threshold gray value for a pixel based on a multiple of a standard deviation from an average gray value of pixels in the first mage.

17. The method of claim 1, wherein the first optical image is an optical image taken after recoating.

18. The method of claim 1, wherein the first optical image is an optical image taken before recoating.

19. The method of claim 1, wherein the first image comprises a reference image.

20. The method of claim 1, wherein the first image comprises a reference set of gray values of pixels.

21. A computing device for detecting deformation in one or more parts during an additive manufacturing process, comprising:
   a memory; and
   a processor, the memory and processor being configured to:
      receive a first optical image of a first layer of build material on a build platform of an additive manufacturing device, the first layer of build material corresponding to the one or more parts being built using the additive manufacturing device before or after recoating of build material on the build platform;
   determine gray values for one or more pixels in the first optical image; and detect deformation in at least one of the one or more parts being built using the additive manufacturing device based on at least one of the gray values in the first optical image compared to a threshold based on a first image of build material.

22. A non-transitory computer readable medium having instructions stored thereon that when executed by a computing device cause the computing device to perform a method for detecting deformation in one or more parts during an additive manufacturing process, the method comprising:

receiving a first optical image of a first layer of build material on a build platform of an additive manufacturing device, the first layer of build material corresponding to the one or more parts being built using the additive manufacturing device before or after recoating of build material on the build platform;

determining gray values for one or more pixels in the first optical image; and detecting deformation in at least one of the one or more parts being built using the additive manufacturing device based on at least one of the gray values in the first optical image compared to a threshold based on a first image of build material.

* * * * *